Sept. 19, 1961 E. P. G. WRIGHT ET AL 3,001,021

ELECTRICAL INFORMATION STORAGE ARRANGEMENTS

Filed March 18, 1954 16 Sheets-Sheet 1

INVENTORS.
E. P. G. WRIGHT
J. RICE
BY
Agent

Sept. 19, 1961 E. P. G. WRIGHT ET AL 3,001,021

ELECTRICAL INFORMATION STORAGE ARRANGEMENTS

Filed March 18, 1954

16 Sheets-Sheet 2

INVENTORS.
E.P.G. WRIGHT
J. RICE
BY Paul W. Hemminger
Agent

Sept. 19, 1961 E. P. G. WRIGHT ET AL 3,001,021

ELECTRICAL INFORMATION STORAGE ARRANGEMENTS

Filed March 18, 1954 16 Sheets-Sheet 3

INVENTORS.
E.P.G. WRIGHT
J. RICE
BY Paul W. Hemminger
Agent

INVENTORS.
E.P.G. WRIGHT
J. RICE
BY Paul W. Hemminger
Agent

Sept. 19, 1961 E. P. G. WRIGHT ET AL 3,001,021

ELECTRICAL INFORMATION STORAGE ARRANGEMENTS

Filed March 18, 1954

16 Sheets-Sheet 5

INVENTORS.
E.P.G. WRIGHT
J. RICE
BY Paul W. Hemminger
Agent

ELECTRICAL INFORMATION STORAGE ARRANGEMENTS

Filed March 18, 1954 16 Sheets-Sheet 6

INVENTORS.
E.P.G. WRIGHT
J. RICE
BY Paul W. Hemminger
Agent

Sept. 19, 1961 E. P. G. WRIGHT ET AL 3,001,021

ELECTRICAL INFORMATION STORAGE ARRANGEMENTS

Filed March 18, 1954

16 Sheets-Sheet 7

INVENTORS
E.P.G. WRIGHT
J. RICE
BY Paul W. Hemminger
Agent

INVENTORS.
E.P.G. WRIGHT
J. RICE
BY Paul W. Hemminger
Agent

ELECTRICAL INFORMATION STORAGE ARRANGEMENTS

Filed March 18, 1954 16 Sheets-Sheet 9

Inventors
E. P. G. WRIGHT- J. RICE

By Robert Harding Jr.
Attorney

Sept. 19, 1961 E. P. G. WRIGHT ET AL 3,001,021

ELECTRICAL INFORMATION STORAGE ARRANGEMENTS

Filed March 18, 1954 16 Sheets-Sheet 10

Inventors
E. P. G. WRIGHT- J. RICE
By [signature]
Attorney

Sept. 19, 1961 E. P. G. WRIGHT ET AL 3,001,021

ELECTRICAL INFORMATION STORAGE ARRANGEMENTS

Filed March 18, 1954 16 Sheets-Sheet 11

Inventors
E.P. G. WRIGHT- J.RICE

By Robert Harding Jr.
Attorney

Sept. 19, 1961 E. P. G. WRIGHT ET AL 3,001,021

ELECTRICAL INFORMATION STORAGE ARRANGEMENTS

Filed March 18, 1954 16 Sheets-Sheet 12

Inventors
E.P.G. WRIGHT- J.RICE

By [signature]
Attorney

Sept. 19, 1961 E. P. G. WRIGHT ET AL 3,001,021

ELECTRICAL INFORMATION STORAGE ARRANGEMENTS

Filed March 18, 1954 16 Sheets-Sheet 13

Inventors
E. P. G. WRIGHT-J. RICE
By Robert Harding Jr.
Attorney

ELECTRICAL INFORMATION STORAGE ARRANGEMENTS

Filed March 18, 1954

INVENTORS
E.P.G. WRIGHT
J. RICE
BY Paul W. Hemminger
Agent

Sept. 19, 1961 E. P. G. WRIGHT ET AL 3,001,021

ELECTRICAL INFORMATION STORAGE ARRANGEMENTS

Filed March 18, 1954 16 Sheets-Sheet 15

INVENTORS.
E.P.G. WRIGHT
J. RICE
BY Paul W. Hemminger
Agent

INVENTORS.
E. P. G. WRIGHT
J. RICE
BY Paul W. Hemminger
Agent

United States Patent Office 3,001,021

Patented Sept. 19, 1961

3,001,021
ELECTRICAL INFORMATION STORAGE ARRANGEMENTS

Esmond Philip Goodwin Wright and Joseph Rice, London, England, assignors to International Standard Electric Corporation, New York, N.Y.

Filed Mar. 18, 1954, Ser. No. 417,193
Claims priority, application Great Britain Mar. 20, 1953
19 Claims. (Cl. 179—7.1)

The present invention relates to interconnecting equipment.

It is an object of the invention to economise in the provision of equipment.

According to the present invention there is provided a number of first equipments, a second equipment, means for connecting any desired slection of said first equipments to said second equipment in different time positions in a recurrent cycle of time positions, a group of stores, recording and reading means for scanning said stores in different time positions in said recurrent cycle, means for recording the identity of a first equipment connected to said second equipment in the store corresponding to the time position in which said connection has occurred, and means responsive to the identity recorded in a store to reconstitute the connection of the corresponding first equipment to said second equipment in the respective time position in each successive cycle during which connection is to persist.

According to the present invention there is provided equipment for storing intelligence, which comprises a number of stores with which are associated recording and reading means and each of which stores is available to any one of a number of user equipments, a control circuit associated with said recording and reading means, means in said control circuit responsive to an electrical condition (hereinafter called a calling condition) indicating that one of said user equipments requires a store to allocate a free store temporarily to that user equipment, and means whereby said temporary allocation can be maintained throughout a plurality of examinations of said allocated store by said recording and reading means.

According to the present invention there is further provided equipment for storing intelligence which comprises an endless track of magnetic material on which intelligenc can be recorded, recording and reading means associated with said track, said track being movable with respect to said recording and reading means and providing a number of stores, which stores are each available to any one of a number of user equipments, a control circuit associated with said recording and reading means, means in said control circuit responsive to an electrical condition (hereinafter called a calling condition) indicating that one of said user equipments requires a store to allocate a free store temporarily to that user equipment, and means whereby said temporary allocation can be maintained throughout a plurality of appearances of said allocated store at said recording and reading heads.

According to the present invention there is further provided equipment for storing intelligence, which comprises a number of storage elements in which intelligence can be recorded as either one of two stable states, means associated with said storage elements for recording intelligence by applying electrical energy selectively to said elements to set each said element to the appropriate one of said stable states, reading means for said elements comprising means for applying electrical energy to said elements in such a way as to set each said element to a predetermined one of said states, and means for re-setting an element changed by said reading if the intelligence read is to be retained, whereby said elements are scanned by said recording and reading means, said storage elements forming a number of individual stores each consisting of a plurality of said elements and each of which stores is available to any one of a number of user equipments, a control circuit associated with said recording and reading means, means in said control circuit responsive to an electrical condition (hereinafter called a calling condition) indicating that one of said user equipments requres a store to allocate a free store temporarily to that user equipment, and means whereby said temporary allocation can be maintained throughout a plurality of scans of said allocated store by said recording and reading means.

The term "store" as used in this specification means a device in which intelligence can be recorded by creating internal strains in the material of the store, and in which stored intelligence or predetermined portions thereof can be detected by detecting the state of the strain in the material or in corresponding portions thereof.

Examples of internal strains which are used to store intelligence are magnetisations of either one of two polarities, as in the magnetic drum, tape or wire, or in the static magnetic matrix, electrifications of either one of two polarities, as in the ferro-electric storage matrix, electric charges of either one of two polarities as in the cathode ray tube storage device, and compression waves in acoustic delay lines, such as mercury delay lines and magnetostrictive delay lines.

The term "store," as used in the present specification and in the claims appended thereto should therefore, be interpreted to include any device falling within the terms of this definition, and in any case includes all the examples listed in the preceding paragraph.

The invention will now be described with reference to the accompanying drawings, which show the invention as applied to impulse regenerators such as are used in automatic telecommunication exchange systems, and in which:

FIG. 1 shows a schematic layout of the equipment when applied to magnetic drum storage, this being referred to conveniently as a dynamic store;

FIG. 2 shows one of a number of communication channels served by the equipment, together with a number of electronic gate circuits which are individual to that channel. These gate circuits act, in effect, as a finder switch. The figure also includes certain additional control equipment.

*The storage equipment*

Figure 1:
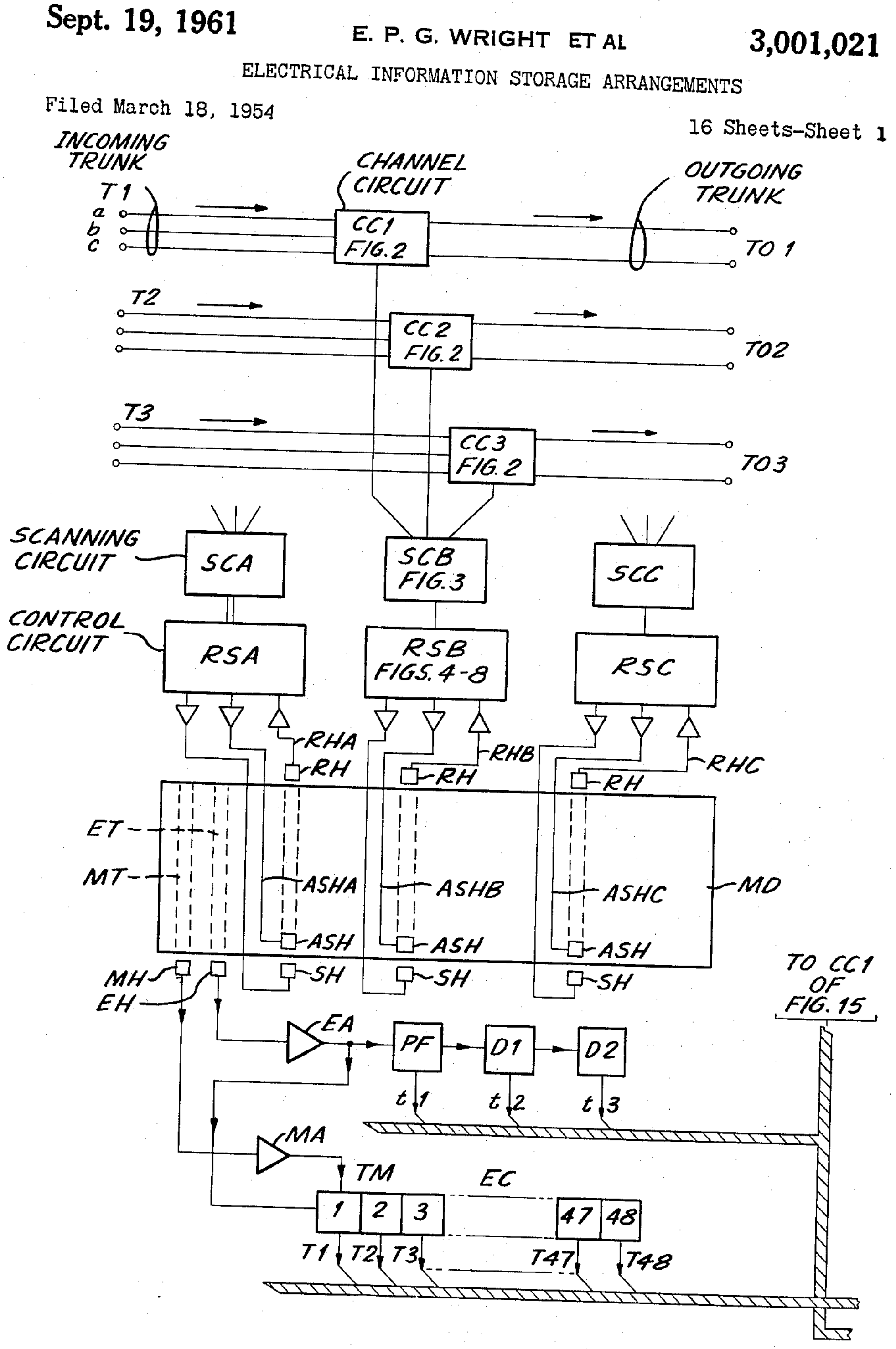

In the embodiment of the invention which has been described, the form of dynamic storage equipment used is a magnetic drum or disc such as has been used in electrical brains as a storage device. It consists, for example, of a hollow brass drum having a magnetic skin on its cylindrical surface. This skin provides a number of closely-spaced peripheral tracks, with each of which there is associated a recording head and a reading head. Each track provides a number of separate stores. In the arrangement to be described there is also provided an auxiliary recording head whose purpose will be described later. The drum is mounted on a spindle rotatable at high speed by an electric motor.

Intelligence is recorded in the form of successive unspaced longitudinal magnetisations of either one of two kinds, which can conveniently be designated "0" or "zero" and "1" or "one." Hence it will be seen that when numbers are recorded they are conveniently recorded in binary digital code although other code forms are possible. When a recording is to be altered this is done by recording on top of the former recording, i.e. by the magnetic recording technique known as overprinting.

Each track is divided into a number of separate lengths of track. How this is effected will be described later, it being clear that there is no physical indication of this division on the actual track. The recording and reading heads are spaced from one another, and two separated lengths of track form a single storage section, or dynamic store. When the reading head is reading one length of track of a store, the recording head is in operative relation with the other length of track of that store. Thus the recorded intelligence is read off, and re-recorded in a corresponding position, this being effected with each modification of the recording as is necessary. Systems of this type are described in our co-pending applications Serial Nos. 289,383, 289,384, 289,385, filed May 22, 1952, application Serial No. 289,386 having been abandoned. It is contemplated that, as an alternative to the provision of two separated lengths of track per store, a single length of track could be used, in which case a compound recording and reading circuit would be employed. The reading off and recording is continuous during continuous rotation of the drum, but at any time the intelligence read off can be routed to outside equipment.

Additional to the tracks on which intelligence is stored there is a track having a recording per element position on all storage tracks. Associated with this track, known as the "clock track," there is a read head known as the "clock head" from which is derived a pulse per element position. As will be indicated this clock pulse cycle is used to derive a set of three narrow pulses per element pulse. A further additional track has a recording at the first element position of each storage section. This track is known as the "marker track," and has a read head known as the "marker head" associated with it. This gives a pulse cycle which defines the commencement of each of the storage sections. These two pulse cycles, the clock pulse cycle and the marker pulse cycle, are used to control all operations.

*General description*

The form of intelligence storage equipment described may conveniently be termed a memory regenerator. It is an electrical impulse regenerator having a number of stores which are available for use by a number of communication channels.

The simplest way to associate these communication channels, which are conversational circuits, with the memory regenerator is to provide the latter with the same number of stores as there are channels, each store always being associated with the same communication channel. However, as the regenerator is only used for the receipt and subsequent retransmission of data, which occupies only a short period of time, whereas the communication channel is in use throughout the connection, this would mean that the storage was used inefficiently. Therefore the number of stores provided is less than the number of communication channels, and arrangements are provided to temporarily associate any store and any channel requiring regeneration. The recordings effected on the store when seized for use are such that on future excursions of the store under the read head the control equipment "recognises" that that store has been seized for use by, i.e. has been temporarily allocated to, a particular channel.

The stores of one particular peripheral track form a group associated with a group of conversational circuits which may be, say, ten times greater in number than the number of stores. A single common interconnection and control circuit is provided between the group of conversational circuits and the track. In a typical example 100 conversational circuits could be associated with 10 stores. However, in the interests of simplicity it will be assumed in the succeeding description that the stores of a track are available to any one of 10 channels.

Figure 9:
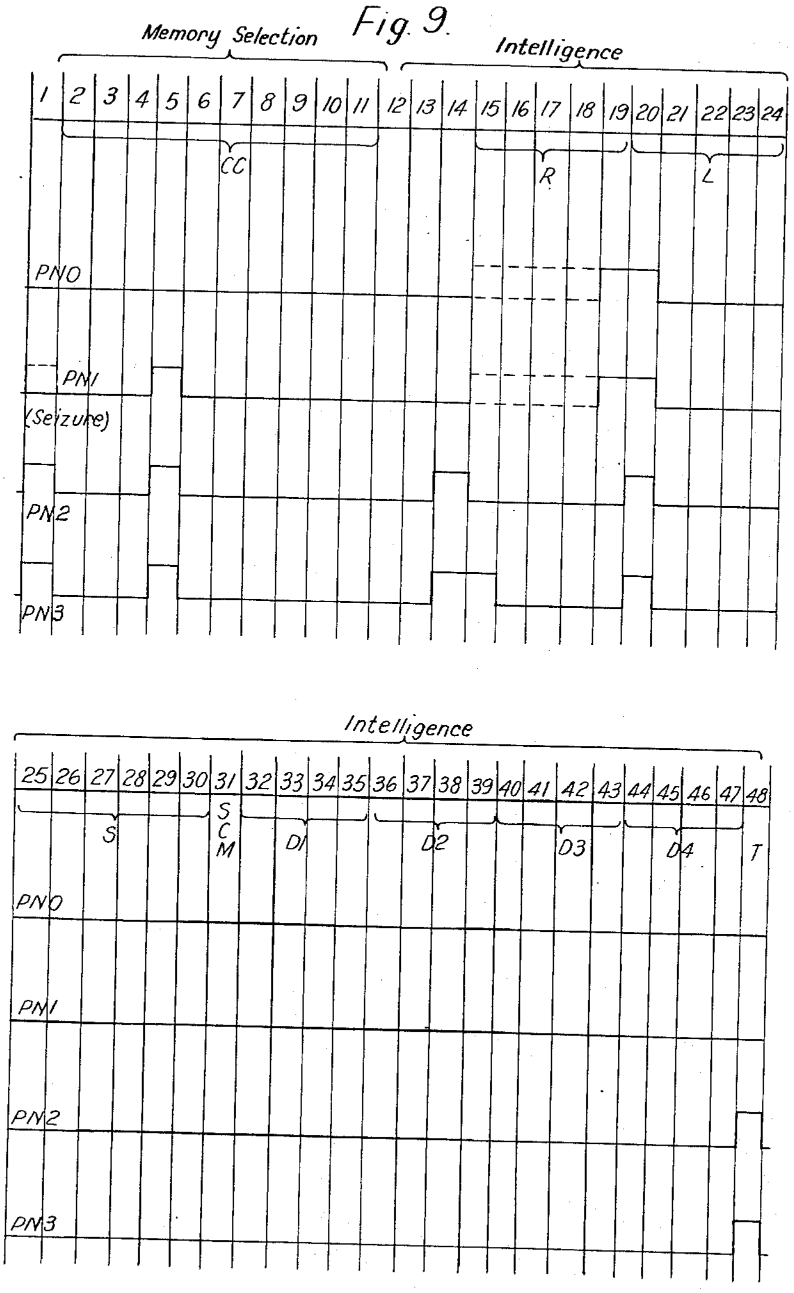
FIGS. 9 to 11 show explanatory charts of waveforms encountered in the circuit to be described.
Figure 10:
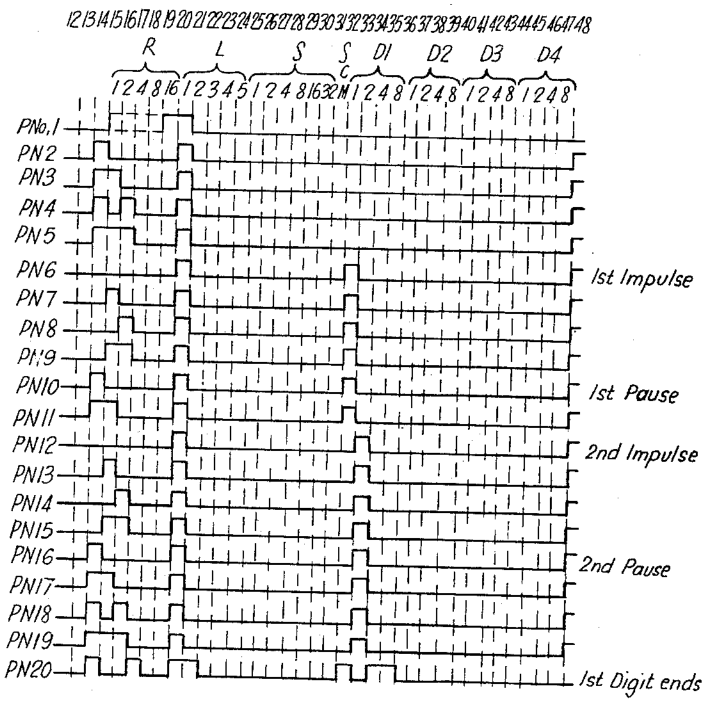
Figure 11:
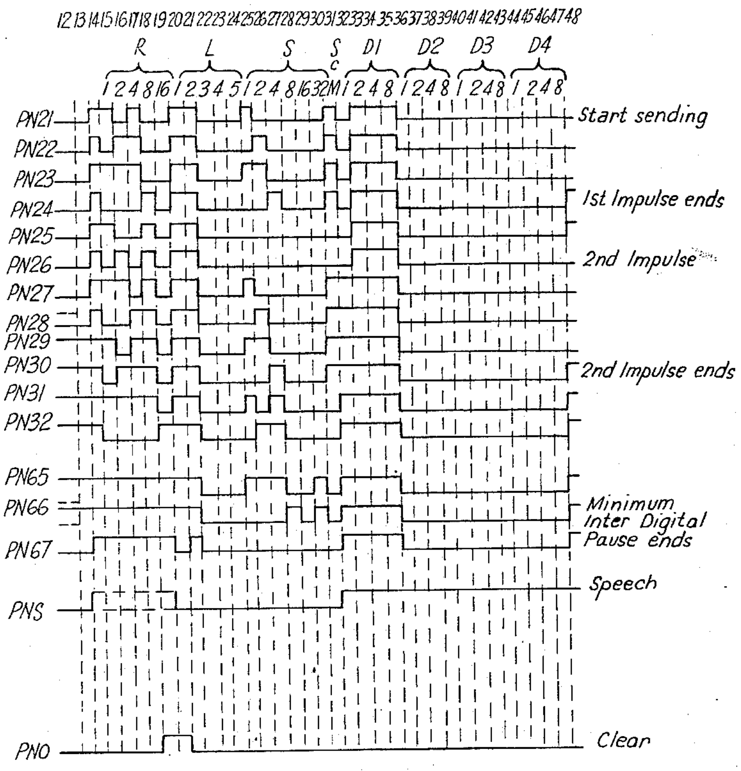

The time charts of FIGS. 9, 10 and 11 show how a section of track forming a store and comprising 48 elements is used for the association of a communication channel with a store, and for the storage and regeneration of digital impulse trains during a series of excursions of the store under the read head. The elements are numbered 1 to 48 and FIG. 9 shows how they are grouped, these elements being used, some singly and some in groups, for various purposes. When a group of successive element positions are used for the same purpose, that group of element positions clearly form a storage portion within the dynamic store. As has been pointed out above, each element is read off and re-recorded either with or without modification at a definite position in a repetitive cycle of time positions determined by the rotation of the drum.

The time pulses generated from the element track in the various element positions are used as controls for electronic gates, and are identified by the prefix T. Where an element forms part of one of the groups illustrated on FIG. 9, this prefix is followed by the group reference. The prefix T, or T followed by a group reference, is itself followed by the element number. Thus gate G16, FIG. 4, has a control TL24, which indicates a time pulse in group L covering element No. 24.

As has been pointed out, the element pulse cycle is also used in known manner to derive three cycles of narrow pulses, with their pulses staggered, each being one third of the duration of an element pulse. These narrow pulses are called *t*1, *t*2, and *t*3, and all three occur once per element.

The above description has already made it clear that the elements of a track are "nose-to-tail," recording being effected by overprinting on the existing recording, if any. When a store is empty, i.e. is idle, its elements 19 and 20 are positively energised, i.e. have "ones" recorded therein. The remainder of the elements of the R group are counting the drum revolutions, as will be described hereinbelow.

*General arrangement*

At this point a brief recapitulation of some of the foregoing description will be useful. Each track on the drum consists of a number of individual storage sections, each storage section consisting of 48 elements. In the present arrangement two such storage sections form a single dynamic store which can be associated with any one of a number of communication channels. In the interest of simplicity of description it is assumed that ten channels are served by the stores of a track. The controlling circuit arrangements have a control circuit common to all stores of each track.

One single section of the track will be considered separately. The first element of a section is used as a free or busy indicator, and the next group of elements are each characteristic of one of the channels to which the track section is available. The group of elements forms an identity-recording storage portion. In the present case, therefore, elements 2 to 11, designated CC2 to CC11, are assigned to the channels 1 to 10 respectively.

The control circuit for the track includes a multi-stable register F14 which has as many positions as there are channels served. A multi-stable register is fundamentally similar to an ordinary electronic counter except that it can be stopped in any position by associated control means. It is controlled by pulses derived from the clock track on the drum. These clock pulses, which occur irrespective of whether any recording has occurred in the element concerned, are prefixed with the letter T, and letters identifying the group of elements, if any to which they belong. Hence when no channel requires the services of a dynamic store, pulses TCC2 to 11 drive the multi-stable register through its cycle. It stays at its last position, TCC11 in the present arrangement, until pulse TCC2 for the next section on that track occurs, when it functions for the next section. At first sight this could lead to confusion, but the nature of the recordings made on the respective track sections are such that this is not so.

It has already been stated that to each channel served there is allotted one TCC time position. That channel can only seize a store for regeneration during its TCC time position. During the normal operation, i.e. during scanning by the multi-stable register in search of a "calling" channel, the section is all at "space" or "zero" except for sections 19 and 20, designated R19 and L20. The reasons for this will become apparent in the course of the description.

*Brief operational description*

A brief operational description of the entire interconnecting equipment will first be given after which the detailed operation of the circuits will be explained. It is therefore to be understood that, where a statement is made that a certain operation is performed, the manner of performing this operation will be set forth in the detailed description.

*Seizure of a dynamic store*

It will be assumed that channel No. 4 requires a store for storage and regeneration purposes. The "calling" channel applies a condition, which is called a "calling condition" to the control circuit which causes the multi-stable register to stop its scanning in the time position allocated to channel No. 4, that is, at TCC5. This causes the re-recording in element No. 5 to be effected as a mark (or one) element. The multi-stable register continues standing at the position for channel 4 while this section of the seized store is passing under the reading and recording heads. As has been pointed out above, it functions for the next store when this passes under the heads.

At the same time that scanning by the multi-stable register is stopped, the "calling" condition on the channel is disabled. This ensures that the channel does not seize a number of stores. The excursion past the heads during which this occurs leaves the track magnetized, as indicated in line PN1–, see FIG. 9.

It is necessary to ensure that the store which has been seized does not become seized by any of channels 1 to 3 on the next excursion, i.e. by channels whose position in the time cycle is *before* that of the channel for which that section of the seized store has been seized and marked with the identity of the "calling" channel. For this purpose the auxiliary recording head, mentioned above, is used. It operates at a time position in the cycle after all the channel element positions. When it operates, by the firing of gate G454 this auxiliary head records a mark in the first element, thus busying the section. In the arrangement described the auxiliary recording head functions at time positions T31. This choice of the position at which this occurs is purely arbitrary, and is in fact largely a matter of mechanical convenience. At the end of the excursion (PN1 is still being considered) time position T48 zeroises the entire control circuit so that it is available for use by the next store. As has been indicated, the possibility of confusion is prevented by the nature of the recordings made in PN1. These recordings indicate (*a*) that the store is busy and (*b*) the identity of the channel for which it has been seized.

At the beginning of the next excursion, represented in line PN2, see FIG. 9—the first element is read off and is recorded again, or re-recorded, as a mark element. Since there are two track sections per store this second excursion commences after the drum has turned through half of a complete revolution. As before, the multi-stable register starts its cycle, but the mark at TCC5 is read off and stops it in its fourth position, that for the channel which seized the store. Hence on each excursion the multi-stable register may be said to scan until it reaches the position for the "calling" communication channel. This mark is also re-recorded. Thus on each excursion the control circuit "reads" the recorded intelligence and sets itself accordingly. During subsequent excursions, the marks in positions 1 and 5 are continually read off and re-recorded. However, these excursions are counted in sections 15 to 19. On the excursion represented by line PN2, mark is recorded at position 14, and positions 15 to 19 are recorded as spaces. At position 20, "mark" is re-recorded, however. Element positions 21 to 47 are recorded as spacers, and a control mark is recorded at position 48. The clock pulse T48 causes a control relay to operate to close the circuit leading towards the right of FIG. 1, hereafter referred to as the "forward" loop, as will be explained later. At T14 of excursion PN2 the channel was itself busied by another relay to be later explained.

On successive excursions until the first digital pulse is received, this operation continues, i.e. marks are read off and re-recorded in positions 1, 5, 14, 20 and 48. These excursions are counted in binary code on element positions 15 to 19 but this count has no effect. The counting has no effect at this juncture but it does no harm and so there is no point in using extra circuitry to disable it. The counting is shown in FIG. 10 on the lines indicated as PN3 to PN5. On each excursion the count is effected by reading all recorded elements of the counting portion and reversing all up to and including the first space element, after which re-recording continues with no change. As can be seen such an operation adds "one" to a recorded binary number. As will be clear, the counting of excursions is really counting the number of half-revolutions of the drum.

*Receipt of first digit*

It is assumed that the first digital impulse is received in time for the excursion represented by line PN6. On this excursion the recordings in element positions 14 to 19 are deleted, i.e. the re-recording of these elements occurs as "spaces." "Spaces" are also recorded in position 20, positions 21–24, 25–30 and 31. The receipt of the first impulse causes a mark to be recorded at position 32, position 1 of portion D1 of the section of the seized store. This indicates that the first impulse has been received. Positions 33 to 47 are re-recorded as "spaces" and 48 as a mark in a manner to be explained.

The digital impulses are long compared with individual excursions, so each such impulse will persist for several such excursions. The excursions during which the first impulse persists are counted in portion R of the track section, that is in element positions 15 to 19. If the impulse being received, a break impulse, is too long, this is indicated by a mark being recorded in position 19, which when read off causes forced release of the circuit with restoration to normal of the track section. Thus the duration of the break is timed by counting the number of excursions of the store under the head; if the break is so long that a fault may be presumed, the recording so produced in element 19 is read by the control circuit as an instruction to cause forced release.

In this case it is assumed that the impulse has the normal length, the counting of excursions represented on lines PN7, PN8 and PN9 timing its duration and the excursions represented on line PN10 being the first excursion which finds that the impulse has ended. This causes a mark to be recorded at position 14 and the recordings in positions 15 to 19 to be deleted. On the excursion represented on line PN11 counting in R recommences and continues until the second digital impulse is received. This count times the make condition of the channels, for a purpose which will be clear in due course.

The second digital impulse is assumed to arrive in the excursion represented on line PN12, and it is recorded in portion D1 (positions 32–35). This is done by adding one to the number, "one" in this case, already stored in that portion. The usual count of excursions for timing the duration for which a digital impulse persists takes place in element positions 15–19 during excursions represented on lines PN13 to PN15. Then the digital impulse ends, causing operations as before.

In the present example it is assumed that the first digit is 2. Since the equipment cannot "know" in advance that this is so, it detects the fact that the digit ends by timing the period between impulses, which is effected by counting the excursions between impulses. This count takes place in portion R (element positions 15 to 19) during excursions represented on lines PN16 to PN20. The inter-digital pause is assumed to be present when a mark has been recorded in position 17. On the excursion during which this happens, marks are recorded in positions 20 and 21. The control circuit then assumes a condition in which the received digit can be retransmitted on the forward loop.

The stored digit in D1 is re-recorded as its complement for the purpose of retransmitting it over the forward loop, as will be explained, i.e. all binary digits are reversed. Any digital impulses received after this are now routed by the control circuit to portion D2 (element positions D36–D39). After the count as explained in the paragraph above which determined that the inter-digital pause had occurred, element positions 15 to 18 are re-recorded as "spaces" (i.e. the count is wiped out) but 19 is recorded as a mark, and remains as a mark until the next digit is received. This ensures that there are no spurious operations of the circuit.

On reception of the first impulse of the second digit, "spaces" are recorded throughout R (i.e. in positions 15 to 19). The receipt of the second digit is identical to that of the first, except that it is recorded in D2, as routed by the control circuit, as will be explained. The third digit is recorded in D3, and so on.

*Retransmission of the first digit*

Impulse transmission over the forward loop will now occur, in a manner to be explained, and as each impulse is sent "one" is added to the number in D1 in a manner to be explained, so that, when all elements of D1 are "mark," the digit will have been completely retransmitted. Each regenerated impulse starts at T48 of an excursion and lasts for four excursions, which excursions are counted in the usual manner, but in portion S, i.e. in element positions 25 to 30. When a digit is sent, its record in portion L, i.e. positions 20 to 24, is erased.

At T48 of the excursion which starts the regenerated impulse, i.e. during PN21, the forward loop, shown at TD1 in FIG. 1, is broken, as will be explained, and element 48 is re-recorded as a space. This shows that an impulse is being retransmitted. During succeeding excursions the next digit can be received, its impulses being stored in portion D2 (element positions 36 to 39), with counting in R, as usual. This does not need to be described, however. During the first excursion of the regenerated impulse, a mark is recorded at position 25, positions 26 to 30 being recorded as spaces.

To record that impulse retransmission is in progress, a mark is recorded in position 31, which position is designated SCM, i.e. "Special Chalk Mark." This mark persists while the impulse is being sent, and its presence is used to make certain that only "one" is added to D1 for each impulse sent. The addition of "one" is effected in the usual manner, i.e. by reversing all elements of D1 up to and including the first space. During subsequent excursions of this impulse counting continues in S, but no other change occurs—apart from any recording in D2 for the second digit. This counting is shown in excursions represented on lines PN21 to 24, FIG. 11, in which there is no second digit recording shown.

At the end of the retransmitted impulse, position 27 is recorded as a space, and as a result of this, element 31 is recorded as a space, element 48 is recorded as a mark, and the impulse is ended at time T48. On the next excursion represented on line PN25, the recording in S is erased, i.e. re-recorded as all spaces.

The second impulse is retransmitted in the same manner, one being added to D1 as before. This occurs during excursions represented on lines PN26 to PN29. During the excursion represented on line PN28, the auxiliary recorder already mentioned is operated to cause a mark to be recorded in element position 12, to indicate that the impulse being retransmitted is the last one of a digit. This occurs when the circuit detects that all of D4 is at "mark." On the next excursion element 13 also receives a mark, which is also recorded during the excursion represented on line PN30. S indicates that the impulse duration has elapsed, and this causes element 48 to be recorded as mark and also causes the impulse to end.

*Inter-digital pause timing*

After a digit has been completely retransmitted, the inter-digital pause is timed, the excursions during which it lasts being counted in portion S. The inter-digital pause lasts for at least 36 excursions, and as the record of 4 for the last digit is left in S the pause ends when S has counted up to 40.

On the first excursion of the inter-digital pause, element position 31 is recorded as a space. From this excursion until the excursion represented on line PN65 all that occurs is that one more is added to the count in S for each excursion.

When the "mark" was put in position 28 during the excursion represented on line PN26, a control (G107, FIG. 6, for F10–2) operated, and a further control (GIII, FIG. 5, for F9) operates when a mark, is recorded in position 30. These controlls will be explained later, and together they show that the correct cycle for that digit has been completed. When the excursion represented by line PN66 occurs, element 12 goes to "space," and during the excursion represented by line PN67, element 13 goes to "space." Position 20 also goes to "space," which indicates that the first digit has been sent, while position 21 goes to "mark." This indicates to the control circuit that the next digit to be sent is the second recorded digit. This excursion also erases the count in S.

During the inter-digital pause, as has been indicated, other digits can be received and stored. The second digit will now be emitted from the store in a similar manner to the first, being issued under control of D2.

The routing of the received digits to their places on the section is controlled by counters C1, C2, and C3 in the control circuit controlled by intelligence read off the L group of elements of the track which effects this by controlling the recording device. One counter C1 causes routing of received digits to the appropriate portions of the store, stepping at the end of each digit, a second counter C2 is used to determine whether retransmission can occur (i.e. is the digit all in, is the inter-digital pause ended, etc.), and a third counter C3 routes the digits out. These counters are set to the positions appropriate to the store with which the controlling circuits are co-operating under control of intelligence stored in parts of that store.

*The second and later digits*

At the end of reception of the second digit, a mark is recorded in position 22 and when the second digit is sent the mark previously recorded in 21 is erased.

In a similar manner marks are inserted in positions 23 and 24 when the third and fourth digits are completely received, while at the end of the retransmission of these digits the marks in 22 and 23 respectively are erased.

When all transmission has been completed element 1 reverts to space, and when space is read at time position T1 it causes the element TCC5 (characteristic of channel 4) to be re-recorded as a space. After element 1 has been re-recorded as a space, the store can be seized for any one of channels 1 to 3 before the mark at element position 5 is re-recorded as a space.

*General*

From the foregoing brief operational description it will be seen that the control circuit functions in a purely passive manner. The intelligence received from the user equipment, i.e. digital impulse trains received from the communication channel, to which a store is allocated, and information which indicates the condition of the user equipment and the stage which the sequence of operations have reached are recorded in the allocated store. The control circuit functions for all stores successively. When a store commences an excursion past the heads, the control circuit is set under control of what the read head reads, and controls such operations as are necessary. While the operations are being performed, the control circuit causes recordings to be made which represent what is in progress. At the end of the excursion the control circuit is zeroised ready for "use" by the next store.

It will be remembered that all timing is done by counting store excursions past the heads: if the equipment employs a compound record/read head and circuit, the timing will clearly be by counting whole revolutions of the drum.

*Circuit conventions*

Before proceeding with the detailed description of the circuit diagrams some explanation of the circuit conventions is required.

Electronic gates, well-known per se, are shown as circles with incoming controls shown as radial leads with arrow-heads touching the circle. Outputs are shown as radial leads with arrow-heads pointing radially outwards. The number inside the circle indicates the total number of controls which must be energised for the gate to deliver an output; for instance, if there are four controls and the number in the circle is 2, then the gate will deliver an output when any two of its controls are energised.

Where a short line is drawn across a control lead, as in the case of the *f*43 control for G62 (FIG. 8), it means that when that control is energised the gate cannot deliver an output, however, many of its other controls are energised. The energisation of such a control may be said to inhibit the gate of which it forms part. Gates are given references beginning with the letter G.

The remaining conventions to be described are those for flip-flops, counters and multi-stable registers.

Figure 5:
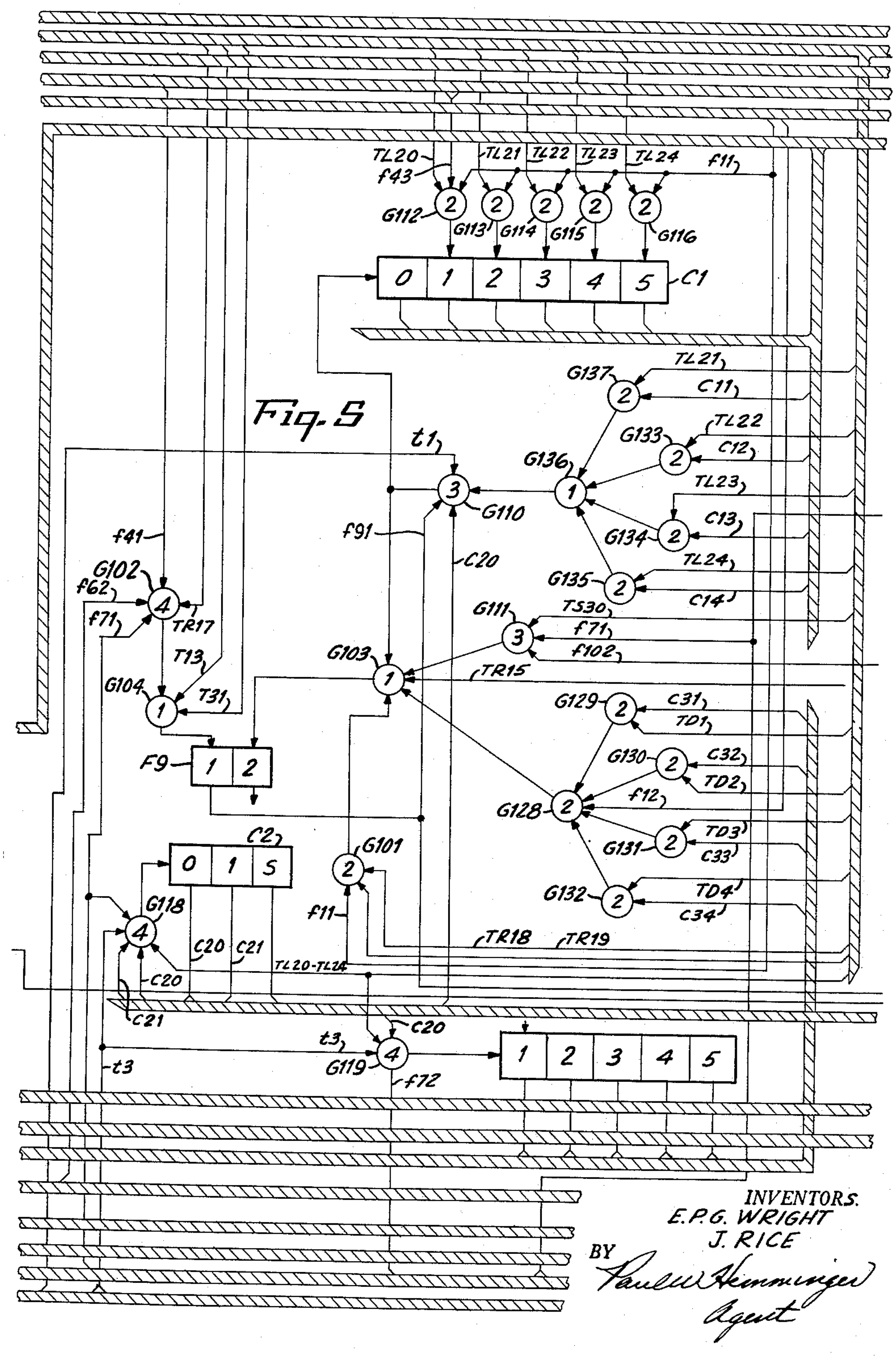
Figure 6:
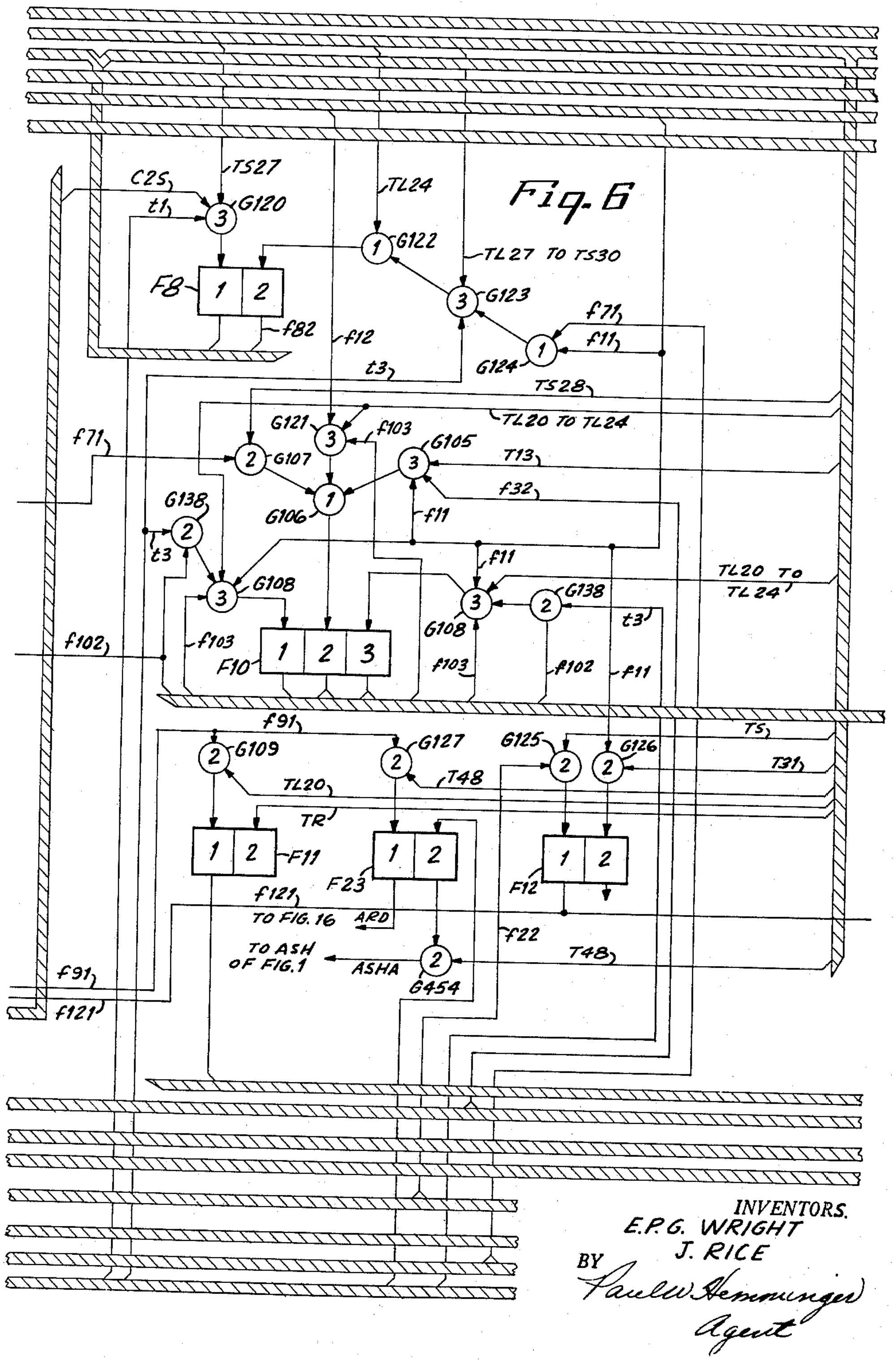

A counter comprising a number of single-component stages each of which is capable of assuming one of two conditions, "on" or "off," is shown as a series of rectangles drawn in linear array, e.g. C3, FIG. 5. The counters shown all count to the end of their cycle and then reset during ordinary operation. A multi-stable register, e.g. F10, FIG. 6, is shown in a similar manner to a counter except that the larger dimension of each rectangle is drawn vertical whereas in the case of a counter it is drawn horizontal. A multi-stable register is similar to a counter, but it does not usually run through its full cycle. Like a counter it has only one stage operated at once, and depending on circumstances any stage can operate next after that, rendering the previously operative stage inoperative.

A flip-flop of the bistable type is essentially a two stage multi-stable register.

The above devices are indicated by the main reference F for flip-flop and multi-stable registers, and by the main reference C for counters used as such or as distributors. The units of counters, etc. are numbered 1, 2, 3, . . . .

If the flip-flop and other circuit outputs were connected to all the gates which they control there would be a complex network of leads which would be difficult to follow. These leads have therefore been omitted and the short control leads to the gates have been given references with a small *f* and suffixes determined by the flip-flop or other circuit concerned and by the unit of the flip-flop energising the lead. Thus flip-flop F11 can energise lead *f*111 or lead *f*112, the final 1 or 2 indicating which unit of the flip-flop is energising the lead.

To facilitate further the understanding of these conventions certain selected parts of the circuits shown have been drawn out in full in FIGS. 12 to 14 and these will be described after the detailed description of FIGS. 1 to 8.

*General equipment arrangement (FIG. 1)*

Before proceeding with the detailed description of FIGS. 2 to 8, some description of the general arrangement of the equipment will be given with reference to the block schematic shown in FIG. 1.

This shows three communication channels comprising incoming trunks T1, T2, T3, corresponding to outgoing trunks TO1, TO2, TO3 respectively. Included in each channel there is a channel circuit CC1, CC2, CC3.

Associated with the three channel circuits there is an electronic scanning circuit SCB, which hunts over the channels in search of a channel needing regeneration. This scanner may, of course, serve many more than three channels, and in fact in the detailed description it serves ten such channels.

At this point it is convenient to examine the magnetic drum MD and its associated equipment. Of the closely packed tracks on this drum five have been shown. The first of these tracks MT is the marker track which, as described above, has an element recorded at mark at the beginning at each storage section of all of the tracks on the drum. Associated with the marker track MT there is a marker read head MH, which reads these pulses and via an amplifier MA partly controls a counter EC which will be described later.

The next track to be considered is the element or clock track ET which has a magnetisation per element position of all tracks. Associated with this track there is an element or clock read head EH, and an amplifier EA. The output of this amplifier goes firstly to an element counter or clock pulse counter EC having a number of positions equal to the number of elements in each track section. The counter EC produces all the pulses prefixed with the letter "T," except the marker pulse "TM." The second output from EA goes to a pulse former circuit PF, which produces pulses *t*1, whose width is one third that of an EA pulse. The second output from PF is applied to a delay circuit D1 which introduces a delay of one third the width of an EA pulse to produce *t*2. The second output from D1 goes to delay circuit D2 which similarly produces *t*3. The separate outputs from EC give the pulses in each particular element position which are much used in the circuit to be described.

The marker track output is designated TM and it will be seen that it is used to reset the counter EC to its normal position.

The equipment associated with a single track will now be described. This includes a read head RH, a recording head SH and an auxiliary recording head ASH, whose purpose will be described in due course. Amplifiers are shown associated with all of these heads, but these may clearly be dispensed with if not necessary. The track being considered is the centre storage track, and this serves the channels shown via scanning equipment SCB. This latter is connected to equipment RSB which controls reading, recording, and insertion and extraction of information.

As is shown schematically other assemblies of heads with circuits RSA, SCA and RSC, SCC are provided for the other storage tracks.

The equipment shown below the drum in FIG. 1 does not require any further explanation, so that the detailed description follows. Detailed description of FIGS. 2 to 8.

*Normal condition*

Figure 3:
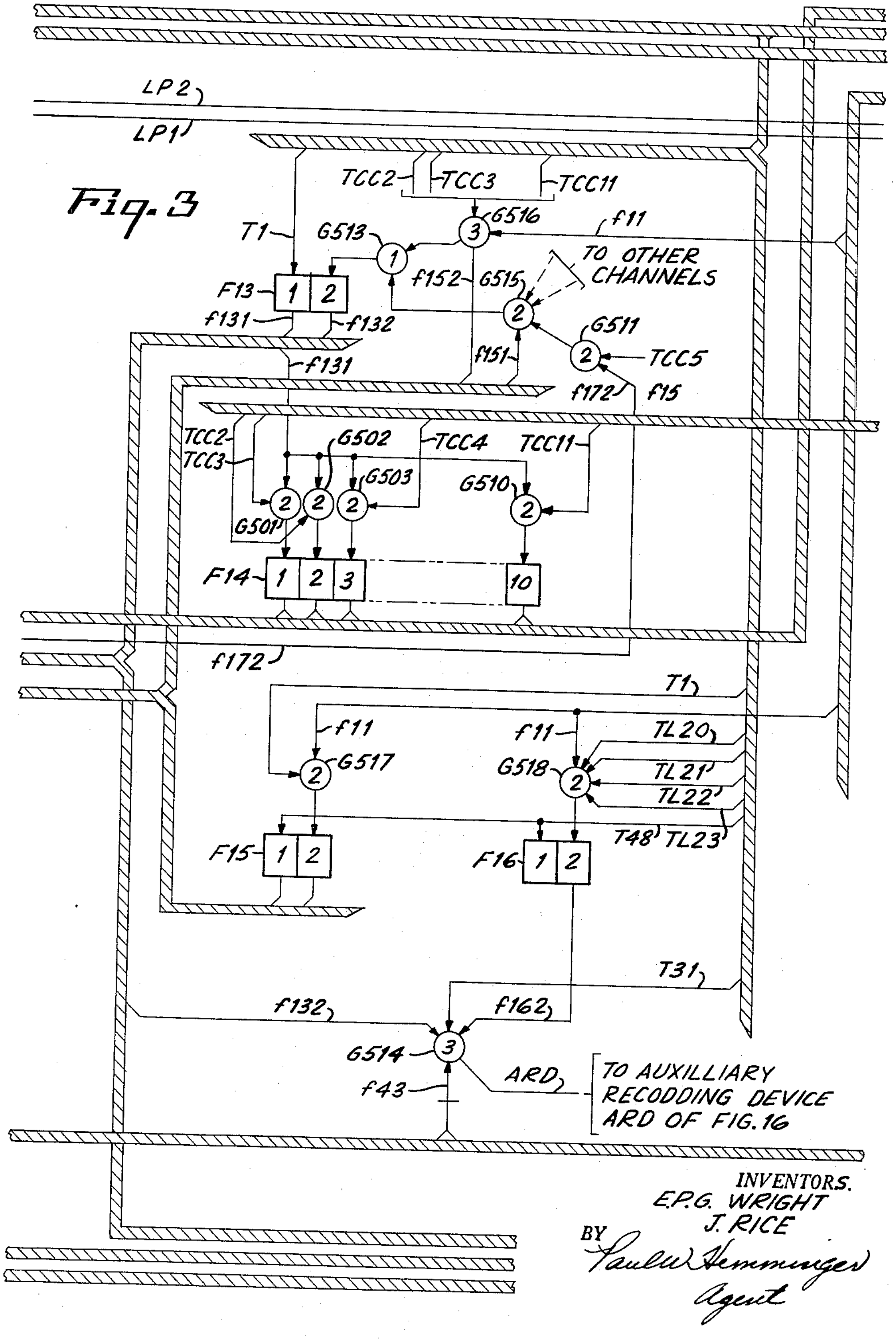
FIGS. 3–8 show the remainder of the control equipment by which access to the store is obtainable and by which the digits to be regenerated are stored in the dynamic store and are thereafter regenerated.

Originally when no communication channel requires storage, F13 and F15, FIG. 3 will have their units 1 energised. At this time, gates G516 and G517 will be closed since unit 1 of F1, FIG. 4, the flip-flop which records the output from the reading device, is not energised during elements 1 . . . 11 when no storage is in use. Also G511, FIG. 3, and corresponding gates for the other communication channels will be closed, since unit 3 of F17 is normally operated via *br2* back, and therefore there is no potential on *f*172.

As a track section starts to pass the reading head, unit 1 of F13 is operated in position 1, so that potential via *f*131 co-operates in turn with pulses TCC2 . . . 11 to open gates G501–G510 successively so that F14 will have units 1, 2 etc. operated in turn. F14 has as many positions as there are communication channels associated with the track; as shown in FIG. 3 it is assumed that there are 10 such channels. Thus each free store offers itself to each communication channel in turn. The outputs from F14 are applied to gates GM1–GM5 of the corresponding communication channels FIG. 2, but these gates will remain closed since *f*132 will be non-conducting. Also these outputs are applied to gates such as G512, G520 (FIGS. 7 and 8), associated with the recording flip-flop, F7, FIG. 7, and will cause this flip-flop to have F7.2 conducting for the duration of the memory selection elements 2 . . . 11. G512 and corresponding gates for other channels will be opened by the appropriate TCC pulses but G519 is held closed by *f*132. However, G520 and corresponding gates for other channels will be opened in turn and G521 is opened by *f*131 so that at time *t*2 in each element 2 . . . 11, G99 opens causing F7.2 to conduct and "0" to be recorded for the selection elements.

*Seizure of a store*

Figure 2:
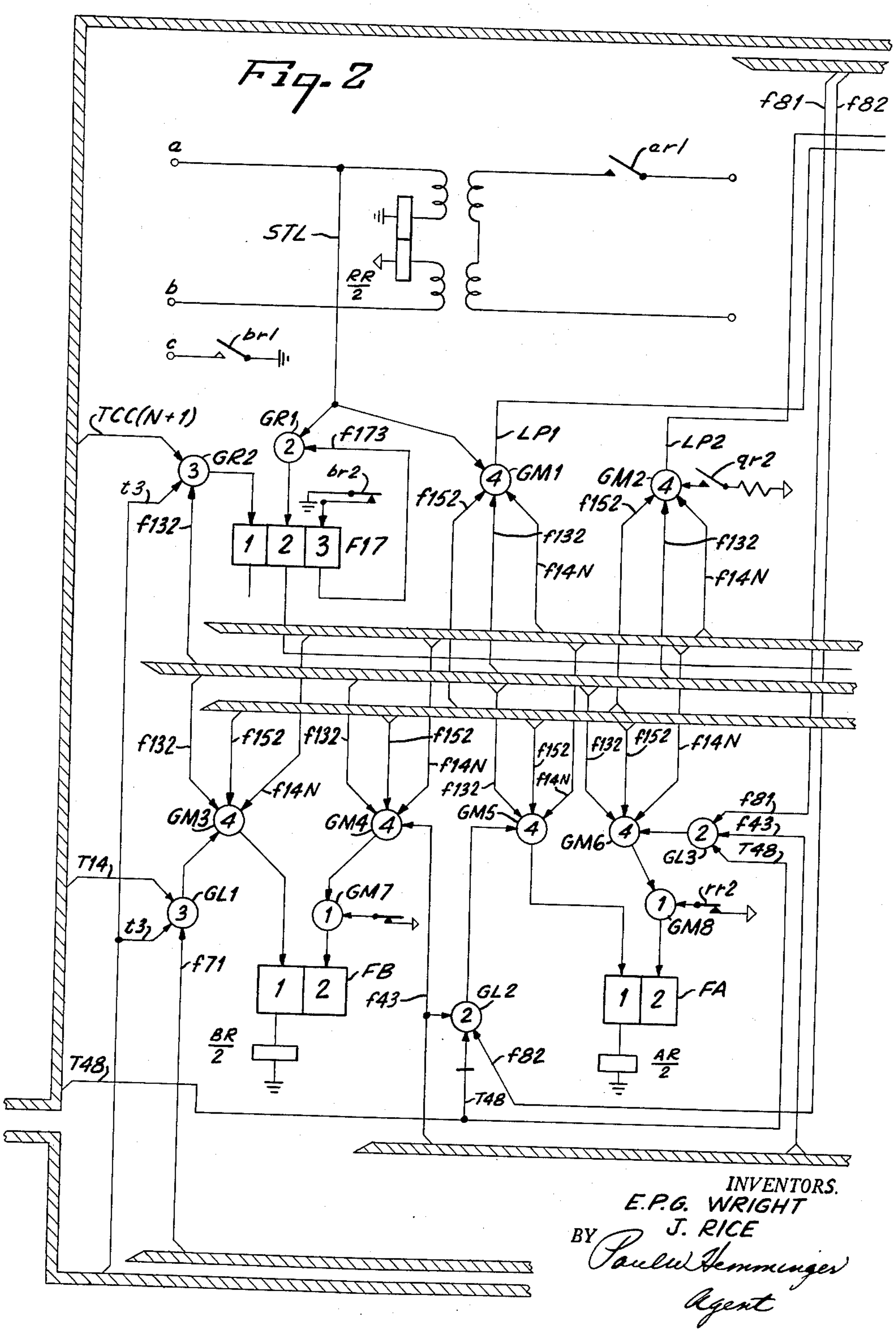

Assume now that, say, communication channel 4 is taken into use and requires storage for regeneration. Initially F17.3, FIG. 2, is conducting, but when the loop across *a—b* is made, a positive signal is applied to GR1 which, in combination with *f*173, causes GR1 to open and F17.2 to conduct. Potential applied to *f*172, FIG. 3, causes G511 to open in time position TCC5 and, since F15.1 is operative, G515 and G513 will open causing unit 2 of F13, to operate. F13.1 being non-operative closes gates G501–G510 so that F14, which at this time has F14.4 conducting will remain in the same position for the remainder of this section of storage, so preventing other communication channels from being associated therewith before the busy element is recorded in position 1. At time *t*3, TCC5, GR2, FIG. 2, will open and F17.1 will operate. The signal is removed from lead *f*172 and so prevents other free stores from being associated with this communication channel.

Figure 7:
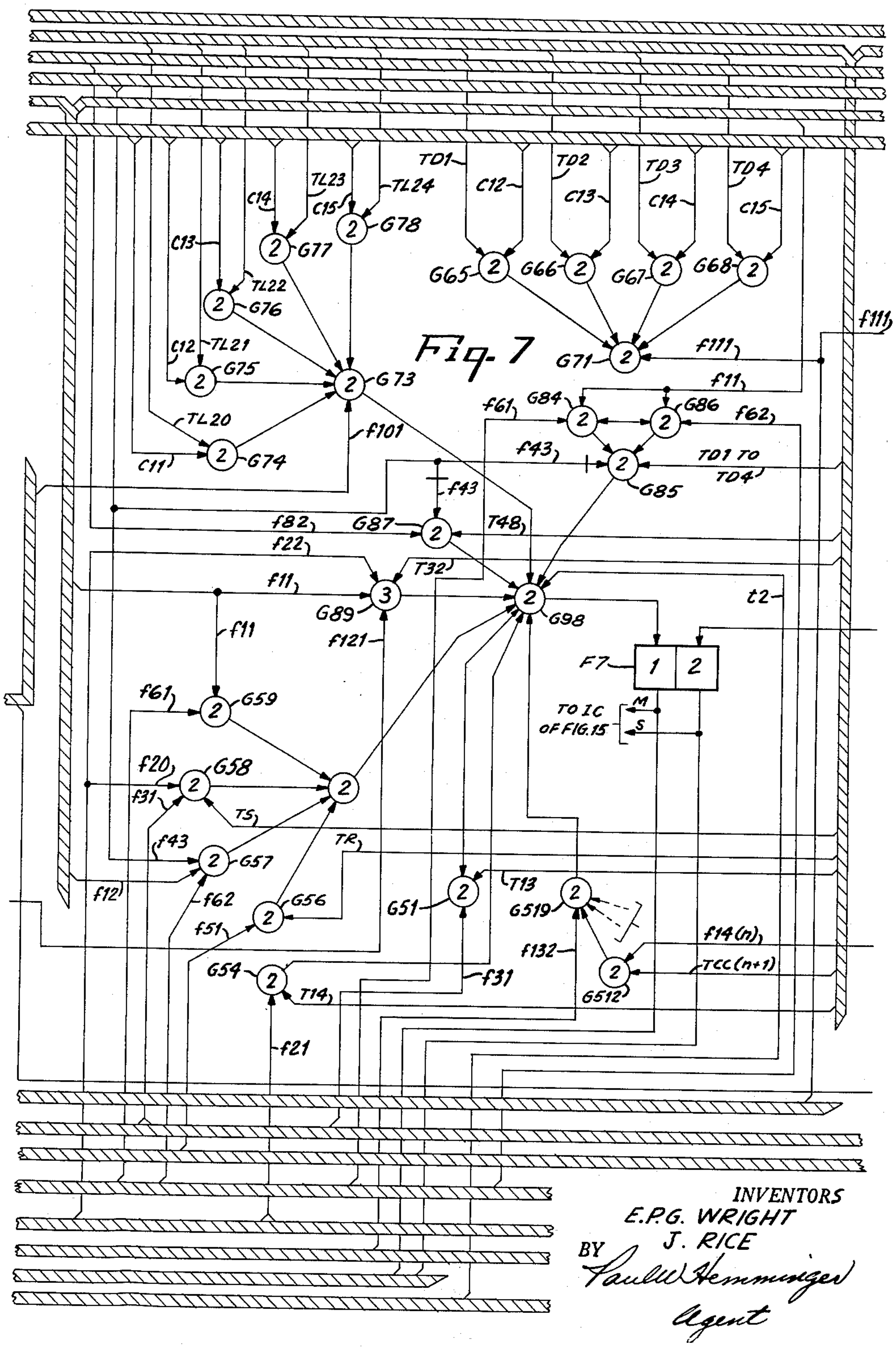

Potential on *f*132 (FIG. 3) in time position TCC5 causes G519, FIG. 7, to open and G521 (FIG. 8) to close and, in consequence, at TCC5, *t*2, G98 (FIG. 7) opens, F7.1 operates and a "1" will be recorded in element 5 of the storage section being considered. Since F14 remains with F14.4 conducting, in the next time position TCC6, G522 and, in consequence, G523 and G99 will open causing F7.2 to operate. Thus for the remainder of the Memory Selection elements, i.e. 6 . . . 11 "0's" will be recorded. The recording made for this stage of operations will be as represented in line PNI, FIG. 9. It will be understood that there are gates such as G512, G520, G522 for each of the memory selection element positions, this being indicated by the use of suffixes $n$, $n+1$, $n+2$ for the time position controls of the three gates actually shown. It will be noted that the time pulse control for the G522 group are one time position later than those for the corresponding gates of the G520 group. The other gates corresponding to G522 are controlled by TCC3 and *f*141, TCC4 and *f*142 . . . TCC11 and *f*149, thus ensuring that when "1" has been recorded for any one of the communication channel elements 2 to 11, the following pulse returns F7 to F7.2 operative. For the case in which 11 is the element to receive a "1" there is no need to return F7 to F7.2 operative for this will be controlled by the intelligence element gates.

It will be appreciated that a storage section must be busied in position 1, otherwise if it is in use with say circuit 4 it could also get connected to circuit 1, 2 or 3. It is necessary therefore to change the condition of element 1 after it has been passed by the normal heads. For this purpose an auxiliary recording device is so located with respect to the normal recording device that element 31 is being read when element 1 is passing the auxiliary recording device. Position 31 has been chosen as convenient for this purpose, but any suitable position after 11 could be used. In position 31, potentials will be present on *f*132, *f*162, as described later, and potential will pass G514 (FIG. 3) to record "1" in position 1. By this means the storage section is busied before the section is read again by the reading device. The particular time position control for G514 determines the position of the auxiliary recording device, T31 being one possible position although, as will be understood later from the use of F16.2 with G514, the position chosen must be latter than 24. F16.2 is used for the following reason. When all intelligence has been received and transmitted the storage section should be released. This stage is denoted by the fact that the elements 20–24 forming group L, will all be "0" when the intelligence has been sent. Thus until this occurs F1.1 will be operative for one or more of these elements and G518 will be opened and F16 set with F16.2 operative. However, when the intelligence has been transmitted, F1.1 will be non-conducting in positions 20 . . . 24 and in consequence F16.1 will be left operative and G514 closed in position 31. As will be shown later this permits release of the store. The magnetic condition of track elements 1 . . . 11 is now shown in line PN2 . . . 3, FIG. 9 and remains so until the excursion illustrated in line PN36, FIG. 11, occurs.

At the end of this particular section of storage, pulse T48 applied to F15 and F16 causes F15.1 and F16.1 to operate in readiness for the testing procedure for the next storage section, and the T1 pulse of the next section returns F13 to F13.1 operative.

When element 1, of the section being considered, is again read, since it will now be "1" F1 is caused to have F1.1 operative, so that G517, FIG. 3, is opened by pulse T1 and F15.2 will operate. Since F15.1 is no longer operative G515 will remain closed so that this store cannot be allocated to any other communication channel by operation of F13.2. However, when pulse TCC5 corresponding to the allocated channel No. 4 is applied to G516, both F1.1 and F15.2 will be operative so that G516 and G513 will open and F13 will have F13.2 operative so that element 5 retains its mark recording. Also F14 will have F14.4 operative and since both F13.2 and F14.4 will remain operative for the remainder of this section of storage, gates GM1–GM5, FIG. 2, will be prepared so that recording of the intelligence elements can take place as described below. Elements 1 and 5 are of course re-recorded as "1's" as previously described and will be maintained in further cycles of operation.

Thus on the next excursion after the common circuit has been seized, namely that numbered PN2 in FIG. 9, F15.2 operates via G517 in time position T1 since the busy condition is marked in element 1. It has already been pointed out that F13.2 is operated by TCC5 and that F14.4 is operated. In consequence potential on lead STL causes gate GM1 to open, and potential is applied via lead LP1 to gate G4, FIG. 4, which will therefore open when time position T14 occurs, followed by G5. Due to the same considerations gates GM2 have three out of four controls in operative condition. Since GM1 opened potential is applied via G4 and G5 to operate the unit 1 of flip-flop F2, applying potential to leads marked *f21*, so that in the same time interval, gate G54, FIG. 7, opens, followed by G98 in the *t2* position of T14 and unit 1 of flip-flop F7 operates to apply a positive signal to the drum in position 14 as indicated in line PN2 of FIG. 9.

Figure 4:
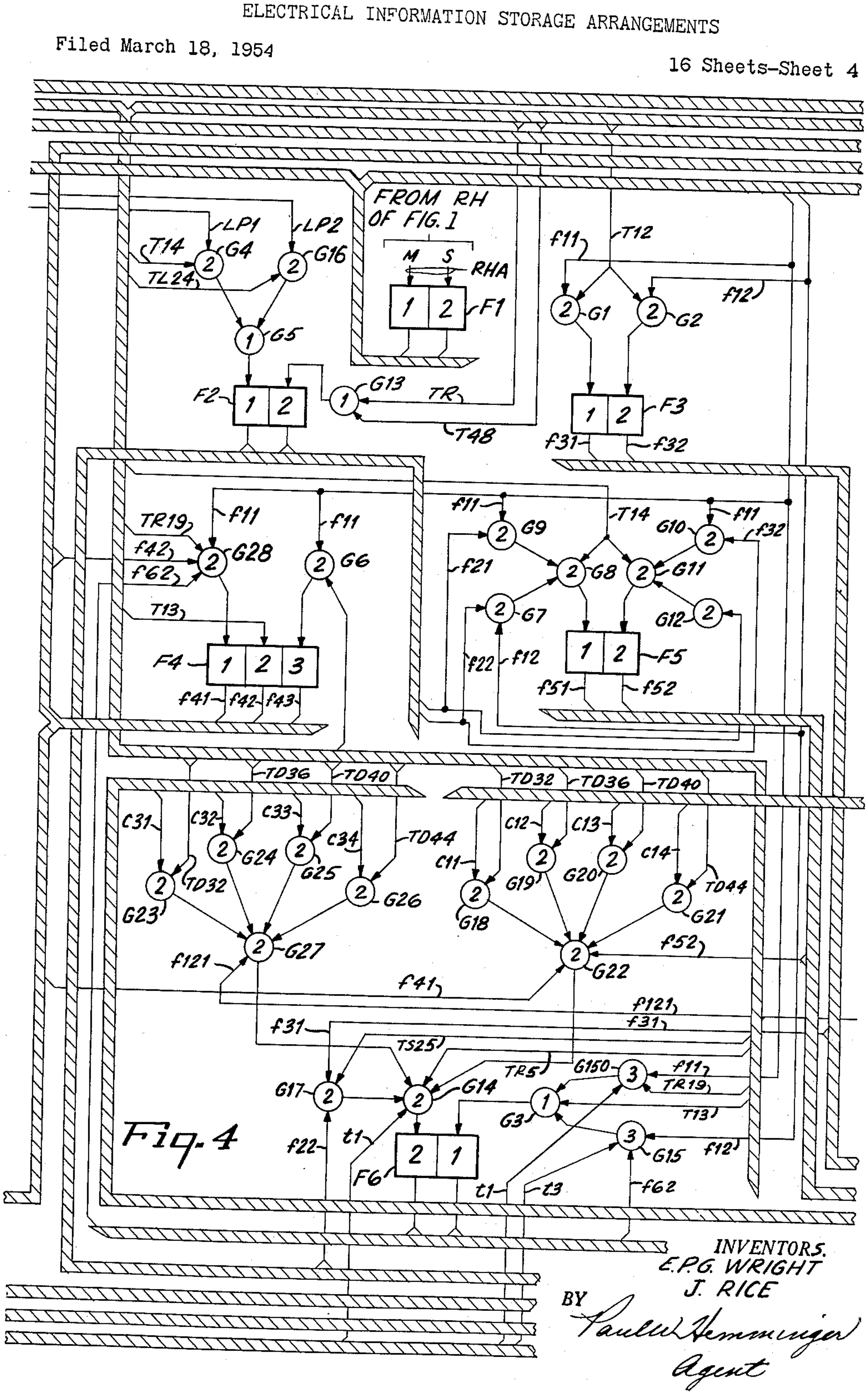

Flip-flop F1, FIG. 4, follows the magnetic condition of the drum track, unit 1 being operated for positive or "1" condition and unit 2 for the negative or "0" condition. In time interval T14 therefore unit 2 of F1 was operated, and in consequence G12 is opened by *f12* and *f21*, followed by G11, so that unit 2 of F5 operates.

Figure 8:
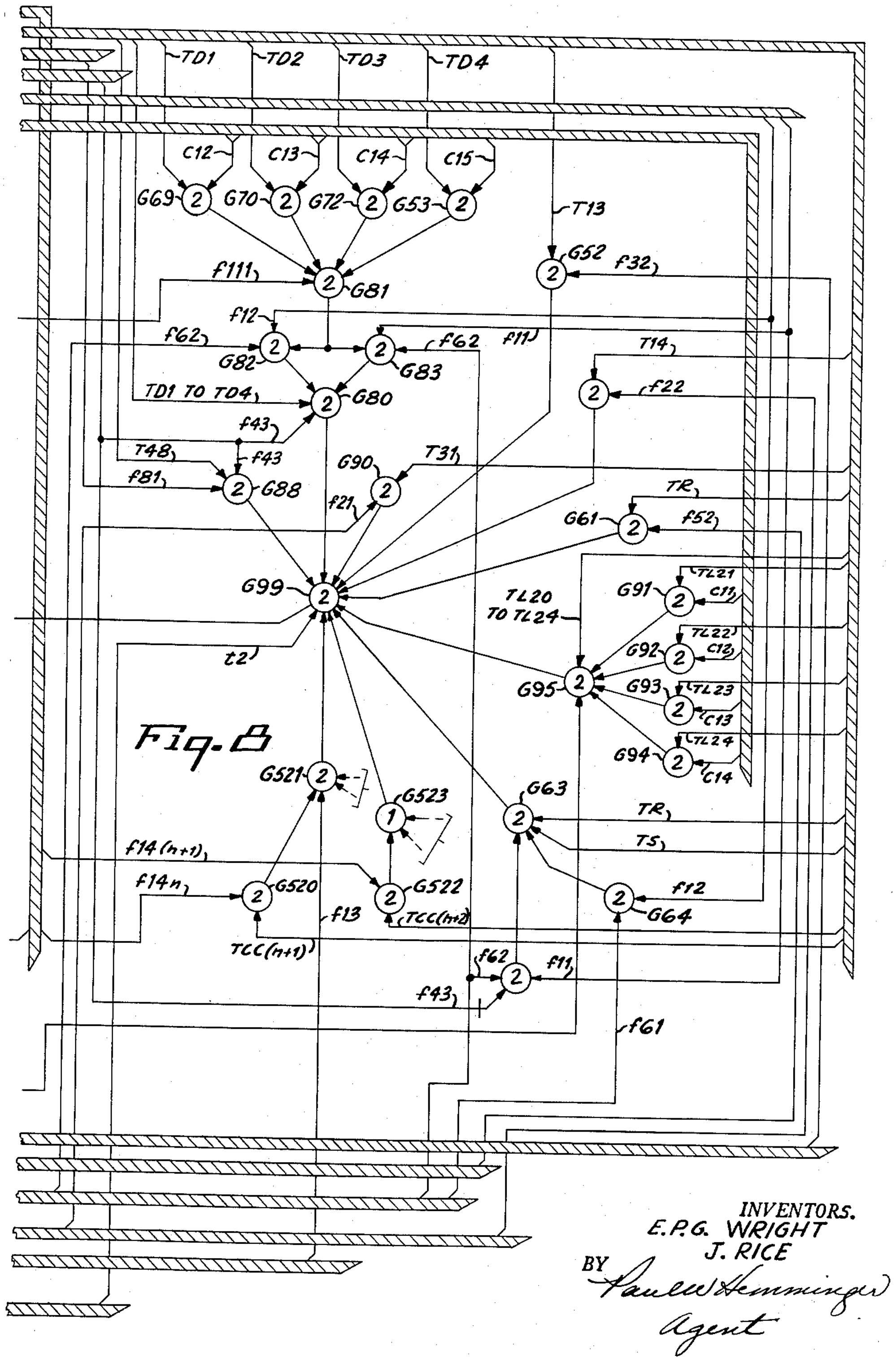

When the group of time positions TR (TR15–TR19) begins, gate G61, FIG. 8, opens, followed in *t2* of element 15, by the opening of G99 so that unit 2 of F7 again operates, and space is recorded for the first and all subsequent element positions of group of time position R. This cancels any positive storage which was effected in R when the store in question was idling as will be described below.

Flip-flop F1 will have unit 1 operated when elements R19, and L20 are read, since these two elements are normally positive. In time interval TL20, gate G112 (FIG. 5) opens due to potential on lead *f11*, and unit 1 of counter C1 operates. With C1 in position 1 during TL20, gate G74 (FIG. 7) opens, followed by G73 since F10, FIG. 5 is normally in position 1. G98 therefore opens in the *t2* position of TL20 and unit 1 of F7 operates to register "positive" or "mark" in element 20.

At the beginning of TL21, the condition of the track changes to "space" and therefore unit 2 of F1 operates so that there is no longer potential on the common lead to gates G112 . . . controlling C1 (FIG. 5), which therefore remains in position 1. G91 (FIG. 8) opens, and in conjunction with TL21 opens G95 so that at *t2* G99 opens, causing unit 2 of F7 (FIG. 7) to operate and the recording head records "space." No further change takes place until position T48 is reached.

Reverting to the communication channel, FIG. 2, when time position T48 is reached, due to flip-flop F8, FIG. 6, being normally in position 2, gate GL2 opens and in turn opens GM5, so that unit 1 of FA operates followed by relay AR. Contacts *ar1* close the forward loop.

Relay BR was operated in time position T14, *t3*, in which gate GL1 had opened with unit 1 of F7 operated. Closure of contacts *br1* busied the repeater.

Also in time position T48, due to F8 being in position 2 and F4 not being in position 3, gate G87, FIG. 7 opens, followed by G98 in *t2*, so that unit 1 of F7 operates and a positive record is made for position 48. Until the first digital pulse is received by the repeater, successive excursions of the section under consideration past the reading head result in the same series of operations as before, except that these excursions are counted on the R positions. This count has no significance at this time, but it is used as required for timing purpose, and takes place in the inter-pulse pauses for the purpose of detecting the interdigital periods. It is however convenient to describe this now while the circuit is otherwise idle.

*Timing operations*

On excursion represented on line PN3, as before, nothing happens in time positions T12, but in T13, unit 0 of counter C1 (FIG. 5) is operated. It will be seen that T13 will always operate C1 to C1.0. The positive record in element 14 is read and re-recorded. As before, in position T14, unit 1 of F2, FIG. 4, operates. This causes G9 to open, since unit 1 of F1 is operated, so that G8 opens and unit 1 of F5 operates.

In TR15, *t1*, G14, FIG. 4, opens and unit 2 of F6 operates and in conjunction with unit 2 of F1, since there was no mark recorded in position 15, G57, FIG. 7, opens. At the same time, G56, FIG. 7, has opened under control of *f51* and TR, so that G60 opens, and in TR15, *t2*, G98 opens and unit 1 of F7 operates to record a mark in position 15.

In TR15, *t3*, due to F1 and F6 both having unit 2 operated, gate G15 (FIG. 4) opens followed by G3 so that unit 1 of F6 again operates. In time position TR16, F1 has unit 2 still operated, so that G64, FIG. 8, opens followed by G63 (due to TR) and G99 in *t2* so that unit 2 of F7 operates and causes a "space" to be recorded in position 16. In the remaining R positions due to unit 2 of F1 always being operated, gate G64, FIG. 8, and not gate G59 (FIG. 7) opens, so that unit 2 of F7 remains operated, and "space" recording continues through R.

In each subsequent excursion, the records in the R positions up to and including the first "space" elements are changed; this change adds "1" to the binary number already recorded in R. For instance, consider the case when position 15 and no other contains a positive record after the excursion represented on line PN3 just described. As before, unit 2 of F6 operates via G14 in TR15, *t1*, but since unit 1 of F1 is operated, G62, FIG. 8, opens instead of G57. G62 is free to open since unit 3 of F4, FIG. 4, is not operated. G63 and G99 in turn open and unit 2 of F7 operates to record a "space" for position 15 in place of the "mark" which was previously there. Since unit 1 of F1 is operated, G15, FIG. 4, cannot open and F6 remains with unit 2 operated.

In TR16, unit 2 of F1 is operated, and with unit 2 of F6 operated, G57, FIG. 7 opens. G56 is also open due to unit 1 of F5, FIG. 4, being operated so that G60 and G98 open in turn and unit 1 of F7 operates to a mark record in position 16. Unit 2 of F1 is operated during TR16, so that in *t3*, G15 and G3 open to operate unit 1 of F6, FIG. 4. This results in recording during TR17 whatever is read, which, in this case, is the "space" condition, due to the opening of gates G64, G63 and G99. It will be seen that F6 detects the first space read in the R group of element positions. When unit 2 of F6 is operated, the inverse of what is read is recorded; when unit 1 of F6 again operates, the positions are recorded as read. This technique results in 1 being added to the binary number recorded in the R positions on each excursion. The counting of the idle rotations is indicated in lines PN3 . . . 5, FIG. 10. During the P*n*3 excursion, contacts *ar2*, FIG. 2, apply potential via GM2, lead LP2, to gate G16, FIG. 4, which therefore opens in time position TL24 to cause unit 1 of F2 to operate. This serves no immediate purpose, however.

*Receipt of first digital impulse*

When the first digital impulse is received, consisting of an opening of the loop on wires *ab*, the change in potential on lead STL results in closure of gate GM1. In consequence in time position T14 of the next excursion, gate G4, FIG. 4, will not open, and F2 is left with unit 2 operated.

It is necessary to delete the record, in the R positions, of the time interval from seizure to the first impulse, and for this purpose the mark recorded in element 14 has also to be deleted.

When time T14 is reached, unit 1 of F1 operates: this is without immediate effect, but *f11* in conjunction with *f22* opens G10 and G11 and operates unit 2 of F5. Control *f22* in conjunction with T14 opens G55, FIG. 8, and at *t2*, G99, opens to make a "space" record for element 14.

At the beginning of TR15, gate G61 (FIG. 8) opens due to *f52* and in *t2*, G99 opens so that F7 continues recording "space." F7 remains in this position for the rest of the R elements.

In position TL20, unit 1 of F1 (FIG. 4) operates. Counter C1 (FIG. 5) was homed in time T13, as previously described. Gate G112 is now opened and unit 1 of C1 is operated. Controls C11, TL20 open gate G74, FIG. 7. Unit 1 of F1 is operated from the "mark" record in element 20, and controls f11, TL20, f103 open G108 to operate unit 1 of F10, FIG. 6, in consequence of which f101 opens G73 since gate G74 is open. In time TL20, t2, therefore G98 opens and unit 1 of F7 operates to record a "mark" in element 20.

In TL21, with C1 in position 1, gate G91 (FIG. 8) opens and with control TL opens G95 to cause G99 to open and operate unit 2 of F7. "Space" recording continues throughout TL21 . . . 24, section S and T31.

It is required to record a "mark" in position 32 of D1 to record the impulse being received.

It will be seen that units 1 and 2 of F4 (FIG. 4) are controlled by f11, T14, and by T13 respectively. This means that during the previous excursions with a "mark" record in element 14, F4 has been flip-flop from unit "1" to unit "2" and back during each excursion. In T14 of the present excursion, since a "mark" has been read and unit 1 of F1 is in operated condition, unit 1 of F4 again operates.

In previous excursions with potential on LP1, unit 1 of F2 operated during T14, and in conjunction with unit 1 of F1 operated, opened gate G9. This time, however, with no potential on LP1, due to the impulse break in the loop *ab*, FIG. 2, unit 2 of F2 remains operated, and in conjunction with f11 opens G10 followed by G11 to operate unit 2 of F5.

When TD32 is reached, with counter C1 in position 1, gate G18 opens, and in conjunction with controls f41 and f52 opens G22, so that in time t1, G14 opens and unit 2 of F6 becomes operative. Controls f12, f62 open G86, FIG. 7, so that G85 (from TD32–35, i.e. TD1 to 4) and G98 open in turn, and unit 1 of F7 operates to record a "mark" in element 32, the first element of group D1 for recording the first digit.

At T32, t3, potential from F6.2 opens G15 and then G3 so that F6.1 operates, and in consequence, the remaining "space" element 33 . . . 47, are read and re-recorded via controls f61, f12 and G82, FIG. 8.

In time position T48, a "mark" is read so that F1.1 is operative. It is desired to keep a "mark" record in element 48 until it is required to re-transmit the digital impulses recorded. This is controlled by F8, FIG. 6, which at present has unit 2 operated. In consequence G87 (FIG. 7) opens followed by G98 and a positive record is made in element 48.

*Timing duration of impulse and detecting its end*

The next function of the control circuit is to detect the end of the first digital impulse which has been recorded, and to measure the duration of the impulse. When the impulse was detected, the excursion counter sub-section R was returned to normal. In the next and subsequent excursions while the impulse persists, "1" is added to the binary number recorded by sub-section R in the manner described above after seizure but before the first impulse was received. If the break in the *a, b* loops, FIG. 2, persist until the last binary storage element R19 goes to "mark," forced release takes place during the next excursion by operating F4.3. This happens because in T19 F12 operates and, with potential on f62 since time position TR15, G28, FIG. 4, operates followed by F4.3. It will be found on examination that all flip-flops are returned to normal and the communication channel is released by the operation of F4.3: these operations will not be described in detail.

It will now be assumed that the first digital impulse ends within the normal period so that potential reappears on LP1.

Excursions represented on lines PN7, 8, 9 indicate the counting of excursions for timing the duration of the first impulse, while line PN10 shows what happens after potential reappears on LP1: at time T14, G4 and G5, FIG. 4, open in turn to operate F2.1. Unit F1.2 will be operated during T14, so that G12, G11 open in turn to operate F5.2. Also in T14, G54, FIG. 7, opens, followed by G93 and F7.1 so that a positive record is made in element 14. The R elements have to be returned to negative condition. This is determined by the opening of G61, FIG. 8, due to the operation of F5.2. On the next excursion represented on line PN11, counting recommences in sub-section R, and continues during subsequent excursions until the next impulse appears.

*Receipt of second impulse*

The recording of the second impulse takes place during the excursion represented on line PN12 by a series of operations almost identical with those where the first impulse was recorded during the excursion represented on line PN6, the only difference being that in sub-section D1, FIG. 9, "1" is now added to "1" instead of to "0."

*Inter-digital pause detection*

It is assumed that the first digit is 2, and that the digit is now completely received. However the equipment does not "know" this, and it has to detect this condition by determining the elapsed time since the last digital impulse was received by counting the excursions since the last impulse was received, and it has to insert a mark in element L21.

An inter-digital pause is detected when a mark has been inserted in R17 during this counting operation. While still in TR17 but after F7.1 has operated, G102, FIG. 5, opens in time TR17, t3, followed by G104 and F9.1 operates. In order to be ready for the next digit C1 must be stepped to C1.2, and to prepare for counting out the first digit, the record in D1 is changed to the complement of the binary number recorded by changing every one of the D1 elements.

F6.1 being operated, the succeeding R elements are recorded as read. In TL20, F1.1, operates so that G112, FIG. 5, opens causing C1.1 to operate. Gate G108 (FIG. 6) also opens due to TL20, f11, f103 and F10.1 operates. In consequence, G74, FIG. 7, opens followed by G73, and 98 and "mark" is re-recorded in element 20.

In TL20, t3, with C2 (FIG. 5) in position 0 and F7.1 operative, C2.1 operates. In TL21, due to C1.1 being operated, gate G137, FIG. 5, opens followed by G136, and G110; causing C1 to step to unit 2 and at the same time opening G103 and operating F9.2 to close G110. TL21 and C12 open gate G75, which together with f101 opens G73, in response to which in t2, G98 opens to operate F7.1 and record a "mark" in position L21. In TL21, t3, C2 steps on to C2.S. This indicates that the first digit has been completely received and that transmission of this digit on the forward loop can take place.

*Retransmission of the first digit*

Nothing further takes place until time TD32. Complementary recording of the digits is governed by gates G71, G86 (FIG. 7), G81, G83 (FIG. 8) and their respective subsidiary gates: It will be noted that G86, controlling operation of F7.1 is itself controlled by F1.2, whereas G83, controlling operation of F7.2, is itself controlled by F1.1. It is there that the record in each element of sub-section D1 will be inverted. The sequence of inversion of the digit is controlled by the subsidiary gates. The TD controls determine which digit will be inverted while the counter C1 controls determine that only one digit at a time will be changed in correct sequence. Gate G71 (FIG. 7) determines at what periods in the overall sequence of operations these changes can take place, while G86 controls inversion of the elements. F11.1 (FIG. 6) was operated in TL20 by F9.1 via G109.

It will be seen therefore that in the present circumstances gates G65, G71 (FIG. 7) and G69, G81 (FIG. 8) remain open throughout sub-section D1, whereas gates G86 (FIG. 7), G83 (FIG. 8) open alternately according as the existing records in the D1 elements are "space" and "mark" respectively, and cause inverse re-recording. In subsequent excursions prior to the receipt of the next digit, TD1 (TD32) and C1.2 will be coincident and therefore G65 (FIG. 7) will be open, but G71 will not be open because F11.1 (FIG. 6) will not be operated, since F9.1 (FIG. 5) is not energised at time TL20 (see G109, FIG. 6) because TR15 (FIG. 5) causes F9.2 to be energised, and G102 is not opened by TR17 for the majority of subsequent excursions due to F6.2 not being energised. During the remainder of the full timing count by sub-section R, we can get the condition that R15, 16 are both "mark" and R17 is "space," but only accompanied by R18, R19, or both being "mark." If at the end of a full count all the R elements were made "space," then the condition R15, 16 "mark," R17, 18, 19, "space" recur. To prevent this, R19 is left at "mark" at the end of each full count until the next break in the loop occurs.

R18 or R19 at "mark" open gate G101 (FIG. 5) to operate F9.2 and render F9.1, non-operative so that at time TL20, G109 (FIG. 6) will not open.

After a full count in subsection R, R15 . . . R18 are made negative on the next excursion due to F6.2 being energised in time TR15. However when time TR19 is reached G150 (FIG. 4) is opened to operate F6.1 and in consequence, F7.1 is operated to re-record a mark in R19. When the loop is broken, F2.2, FIG. 4, remains operated and since element T14 was mark in the loop condition, G10, G11 open to operate F5.2. In consequence, G56 (FIG. 7) remains closed during TR and G61 (FIG. 8) opens to cause space to be recorded throughout TR.

It will be seen that by sending out impulses and adding 1 to the binary number in sub-section D1 for each impulse sent, the first digit will be completely sent when all elements of D1 are "mark."

Each impulse is started during the last element position of an excursion and persists for four excursions which are counted by the "marks" inserted in sub-section S. As each digit is sent, its record in sub-section L is removed.

Transmission of the first impulse is initiated by changing element 48 from "mark" to "space." As previously explained, in the current excursion, unit C2S of counter C2 became operative and in consequence in time position TS27, *t1*, G120, FIG. 6, opened, thus operating F8.1. Thus, in time position T48, G88, FIG. 8, opens by means of *f81* causing space recording for element 48. The same control combination T48, *f81* opens GL3, FIG. 2. This applied potential to GM6. It will be remembered that F14, FIG. 3, causes the recording of the identity of the communication channel FIG. 2, to which the seized store has been allocated. At present F14 is in position F14.4 and is thus applying potential to GM6. Further, units F13.2 and F15.2 are still operated so that GM6 opens, followed by GM8 to operate FA2 which in turn releases AR to start impulse transmission at *ar1*.

In succeeding excursions further digital impulses can be received and stored in the manner set out above except that the next digit is stored in sub-section D2, and so on. We shall however confine our attention to impulse transmission which started in position 48 during the excursion represented on line, PN20, FIG. 10. Succeeding excursions are graphically shown in FIG. 11. The counting operations shown in line PN21 . . . for Section R will be ignored so that the first operation with which we are concerned will be the counting of a first excursion by the insertion of "mark" in sub-section S. The release of AR opened contacts *ar2* to remove potential from lead LP2, FIG. 2. Unit 1 of flip-flop F2, FIG. 4, may have been operated by LP1 in position T14 via gate G4, but in any case during time TR, F2.2 will again have been operated. Due to removal of potential from LP2, G16 will not open in TL24, so that F2.2 remains operated, and in time TS, gate G58 (FIG. 7) opens. Unit F1.2 is operative since the group of element positions S is empty, i.e. all are at "space." Also TS25, *f22* have opened G17, FIG. 4, and in TS25, *t1*, G14 also opens to operate F6.2. In consequence G57 (FIG. 7) opens and in co-operation with G58 opens G60, so that in *t2*, G98 operates F7.1 and records a "mark" in element position 25. At *t3* of the same element potential from F6.2, in co-operation with *f12* opens G15, FIG. 4, so that F6.1 again operates and prevents the recording of "marks" in element positions 26 . . . 30. These elements give a "space" reading to F1, so that potentials on *f12*, and *f61* open G64, G63 (FIG. 8) so that F7.2 operates to re-register the "space" record for these elements.

It is necessary to record the fact that an impulse is being transmitted so that after an impulse has been added in sub-section D1 during the present excursion as will be explained, no more impulses will be added in D1 until transmission of the first impulse is completed and transmission of the second impulse starts. This record is made in element 31 between sub-sections S and D1.

The combination TS, *f22* also operated F12.1, FIG. 6, via G125, so that in T31, *f121* and *f22* open G89 (FIG. 7), so that in *t2* of T31, G98 operates F7.1 to cause a "mark" record in element 31. An impulse has now to be added in D1.

In position TD32 with the "out-counter" C3 in position 1, gate G23 (FIG. 4) opens and in conjunction with *f121* from FIG. 6 opens G27 so that in *t1*, TD32, G14 opens and operates F6.2. It is now required to change each D1 element record up to and including the first "space." If element 32 is "space," F1.2 operates, and with F6.2 operated, G86 opens followed by G85, G98 to operate F7.1 to make a "mark" recording. In TD32, *t3*, F6.1 (FIG. 4) again operates because element 32 had been read as "space," and this prevents any further change in the re-recording of the TD1 elements. In the particular case shown in PN21, element 32 was, in fact, at "mark" and was re-recorded as a "space" by opening G83, FIG. 8, due to *f11* and *f62*, followed by G80 and G99, to record a "space." F6.2 remains operated so that element 33 which is "space" is changed to "mark" by G86 as described above, and F6.1 is now operated to stop reversal, so that elements 34, 35, which were already "mark," are re-recorded as such by means of G84.

The remaining elements 36 . . . 48 are re-recorded as read, subject to the possibility that digit storage may be in progress in D2.

In each of the next three excursions an impulse is added in group of element positions S, but no change takes place in element 31 and D1 because transmission of the first impulse is still in progress.

In the excursion represented by line PN22, when S is reached F1.1 operates for element 25. F2.2 has been re-operated if necessary in position TR, so that in TS25, G17, G14 open and operate F6.2. Under control of *f62*, *f11*, gate G62 (FIG. 8) opens followed by G63 and G99 and F7.2 operates to record a "space." F6.2 remains operated so that in element 26, with F1.2 operated, G57, FIG. 7, opens, and in conjunction with G58 which is opened by TS, *f22*, opens G60 followed by G98 to cause F7.1 to record a "mark." In *t3* of the same element, F6.1 again operates via G15 and G3, and the remaining elements of S are re-recorded as read.

During the excursion represented on line PN21, F12.1 (FIG. 6) was operated in TS by *f22* and remained so operated through element 31, which is designated the SCM element and D1. During the excursion represented on line PN22 unit 2 of F12 is operated in T31 since element 31 has been read as "mark" and there is potential on *f11* so that G126 opens.

Also in T31, G89, FIG. 7, is opened by *f11*, *f22* so that element 31 is again recorded as "mark." Since F12.2 is operated, G27, FIG. 4, cannot be opened and F6.1 remains operated. In consequence, G84 (FIG. 7), G82 (FIG. 8) record the D1 elements as read.

In the excursion represented on line PN24, the addition of a further impulse in making four in all, makes element 27 a "mark." In time T27, *t1*, with unit S of counter C2 still operated, G120 (FIG. 6) opens to operate F8.1 as before. However in TS27, *t3*, on this occasion, due to F7.1 being operated to record a "mark" G124 opens followed by G123 and G122, and F8.2 re-operates. Unit 2 of flip-flop F6 (FIG. 4) is not operated during this excursion, so that elements 28 . . . 47 are re-recorded as read. However, in T48, due to F8.2 being operated, G87 opens and a "mark" is recorded in element position 48. Controls *f82*, T48 also open GL2, FIG. 2, so that GM5 opens to operate FA1 and relay AR, so that contacts *ar1* close to terminate the first impulse, and contacts *ar2* close and again apply potential to open GM2, which replaces potential on lead LP2.

During the excursion represented on line PN25, in TL24, F2.1 is operated because PL2 opens G16 and G5. G17 in FIG. 4 is therefore unopened in TS25, and F6.1 remains operated. It is now required to wipe out the "mark" records in S and in T31. The first S element 25 is "space" since digit 4 is recorded in S, and in consequence G64 (FIG. 8) is opened by *f61*, *f12*, followed by G63 and G99, and F7.2 operates to re-record "space." Since F2.1 is operated, gates G57, 58, 59, 89 (FIG. 7) controlling operation of F7.1 for S and T31 cannot operate F7.1 and "space" records are made throughout S and for T31. During TD1, F6.1 remains operated because F12.2 is still operated and therefore G27 (FIG. 4) cannot open. Gates G84, G82 now control the re-recording of the D1 elements as read since *f11* opens G84 to operate F7.1, and *f12* opens G82 to operate F7.2. Element 48 is re-recorded as "mark" via G87 and relay AR remains operated.

The excursion represented on line PN26 is used to initiate the second impulse by removing the "mark" record in element 48 as was previously done in the excursion represented on line PN20. In time TS27, *t1*, F8.1 (FIG. 6) operates as before, and it remains operated since in TS27, *t3*, neither *f71* nor *f11* are operative so that G124, 123, 122, remain closed. On reaching element 48, G88, FIG. 8, opens due to *f81* and T48, so that F7.2 makes a "space" record.

In addition, *f81*, T48 open GL3, GM6, GM8 (FIG. 2) to operate FA.2 and to release relay AR so that the second impulse commences by the opening of contact *ar1*. As usual, the impulse continues throughout the next four excursions, namely those represented on lines PN26 . . . 29, during which the operations are described for the first impulse except that D1 receives an additional impulse which completely fills it, i.e. leaves it at "all mark" thus determining that the impulse being sent is the last for the digit, in response to which elements 12, 13 are changed to "mark" as follows. In the excursion represented on line PN27, D1 is completely filled. In consequence in the excursion represented on line PN28 at time position TD1, although G129, FIG. 5, is opened by TD1, C3.1, G128 will not open because *f12* is not operative, so that unit F9.1 remains operated. In time position T48, G127, FIG. 6, is opened under control of *f91* and operates F23 to F23.1 and the auxiliary recorder records a "mark" in element 12, as described earlier for element 1 in excursion PN1. F23 is restored to F23.2 operated at *t3* of the same element.

In time T12 of the excursion represented on line excursion PN29, F1.1 operates G1, FIG. 4, which opens and operates F3.1. In time T13, G51, FIG. 7, opens, due to *f31*, T13 and "mark" is recorded in element 13. As before, in T48, with *f91* operative, G127 (FIG. 6) opens to cause the auxiliary recorder to insert a "mark" in element 12.

In the excursion represented on line PN30, the detection of "mark" in element 12 again causes element 13 to be re-recorded as a "mark" and in due course the auxiliary recorder makes element 12 "mark." In the meantime, the counting S has recorded the fourth excursion for impulse 2, so that element 27 is "mark." As described in the case of the excursion represented on line PN24, element 48 is again made "mark" and relay AR, FIG. 2, is re-operated to terminate the regenerated second impulse and at the same time terminate the first digit.

It is now necessary to time an interdigital pause which is performed by inserting "marks" in the group of element positions S.

So far as FIG. 11 is concerned, receipt of the second digit from the communication channel FIG. 2 has not yet started, and lines PN21 . . . 30 shows the element position R being used for counting the excursions until the receipt of the second digit starts. Sub-section R will complete its count of inserted "marks" more than once if the second digit is delayed. Receipt of the second digit has been omitted from FIG. 11 as it would unnecessarily complicate the chart. It will be appreciated however that receipt of the second digit would very closely resemble the operations shown in lines PN6 . . . 20.

*Timing interdigital pause on retransmission*

The minimum interdigital pause is 36 excursions, after which the "mark" record of the first digit in element group L is erased, i.e. re-recorded as "all space" to allow of re-transmission of the second digit after receipt. The record in S is retained so that counting of the interdigital period is from 4 to 40. In the excursion represented on line PN31, F1.1 again operates, followed in time position T12 by F3.1, so that in TS25, control *f31* opens G17, G14 to operate F6.2.

Controls TS, *f31* open G58 (FIG. 7). Since element 25 is at "space," controls *f62*, *f12* will open G57, so that G60 will in turn open and a "mark" will be recorded, thus adding "one" to the record already in S. As before, F6.1 now operates in TS25, *t3* to allow of re-recording as read for the rest of S.

Since relay AR is re-operated, potential is applied to LP2, FIGS. 2 and 4, so that in time TL24, F2.1 is operated. In T31, G90, FIG. 8, is opened by *f21*, and element 31 is re-recorded as a "space." The remaining elements are re-recorded as read.

From the excursion represented on line PN32 to that represented on line PN65, nothing happens except the addition of "1" in S for each excursion. As the "mark" record is made in element 28 during the excursion represented on line PN66, controls *f71*, TS28 open gate G107, FIG. 6, and G106 to operate F10.2. As "mark" is recorded in element 30, controls *f71*, TS30, and *f102* open G111, G103 to operate F9.2 (FIG. 5).

In consequence in T48, there will be no potential on *f91*. In consequence, F23 will remain with unit 2 operated and in T48, gate G139 will open to make a "space" record in element 12. This is due to the successive operation of F10.2 and F9.2 by the "marks" in elements 28, 30 respectively.

Since element 12 is at "space" during the excursion represented on line PN67, element 13 will be read as "mark" but will be recorded as "space," since controls T13, F1.2 open G2 to operate F3.2, and *f32* opens G52, FIG. 8, in T13. Also at time T13, controls T13, *f11*, *f32* open G105, G106 to operate F10.2 (FIG. 6). In time position TL20, G95, FIG. 8, is opened by *f102* and TL20, to record a "space" in place of the previous "mark." In TL20, *t3*, G138 (FIG. 6) is opened by *f102*, G108 is then opened by TL20, *f11* and G138 so that F10.1 operates. In TL21 therefore, G75 (FIG. 7) is opened by TL21, *c12*, and G73 is opened by G75 and *f101* so that "mark" is recorded in element 21. In time TL22, G92 (FIG. 8) is opened by *c12* and in turn opens G95 to record a "space." The remaining elements of L are re-recorded as read.

It is necessary now to erase the "marks" recorded in S.

In TL24, LP2 has opened G16, G5 to operate F2.1. In TS25, G58 (FIG. 7) which is controlled by *f22* or *f31*, cannot open so that G60 cannot open, so preventing recording a "mark" in sub-section S. "Space" is therefore recorded because G64 (FIG. 8) is opened by *f12*, *f61* and operates F7.2 via G63 which then remains operated throughout S.

*Counter operation for subsequent digits*

It is considered unnecessary to describe the recording and transmission of subsequent digits in detail, but the sequence of operations as controlled by counters C1, C2, C3, will now be described. The second digit is received with C1 in position 2 and at the end of recording C1 is stepped to position 3 in TL22, and so on. The stepping of C1 is controlled by gates G137, G133, G134, G135 which are opened in turn in counter positions *c11* . . . *c14* and respective time positions TL21 . . . 24.

Counter C2 is used to determine whether transmission of another digit is allowable. The control gate G118 can be opened in any two consecutive TL positions in which "mark" as indicated by *f71* is recorded during an excursion with C2 in positions 0 and 1 respectively, so that C2 steps from 0 to 1, and to S in turn if these conditions exist. C2 in position S permits transmission of the next digit. C2 is returned to 0 in time position T12 of every excursion by potential directly applied to unit 0 of C2.

C3 counts the sending of the digits. So far it has remained in position 1. Stepping of C3 to its next position at any time depends on the existence of conditions such as are shown in line PN67, FIG. 11, in which the first L position is "space."

C3 counts empty consecutive L positions from 20 onwards and is homed in every successive T12 position. For such positions *f72* will be operated, and as stated above C2 will be in position 0, so that in time position *t3* of each consecutive position TL20 . . . 24 in which *f72* is active, C3 will be impulsed and will take a step. As however in line PN67, TL20 is empty but TL21 is occupied, in TL21, *f71* is active instead of *f72* and C2 steps to position 1 so that C3 cannot step in response to the active condition of *f72* in later empty L positions.

As before, receipt of second digit is recorded. Since C1 is now in position 2, gate G74, FIG. 7, is not opened in time position TL20 of the next excursion after receipt begins, nor is G91 (FIG. 8) in position TL21, but instead G75 (FIG. 7) opened by TL21, *c12* to record a "mark" in position L21.

Whereas in the case of the first digit, C1 was in position 1, so that in time position TL32, *c11* opened gate G18 (FIG. 4), in the case of the second digit G18 is not opened, but in TD36, potential on *c12* opens gate G19, and in this way the first impulse of the second digit is recorded in position 36 instead of in position 32, and the digit as a whole is recorded in position group D2 comprising elements 36 . . . 39.

At the end of the second digit, a "mark" is inserted in time position TL22 after C1 has been stepped to C1.3 by the opening of gates G76, G73, G98, FIG. 7. The second digit is reversed and sent out in the same manner as the first digit except that time positions TL36 . . . 39 are involved instead of TL32 . . . 35. The other digits are received and retransmitted in similar fashion.

At the end of transmission, the "mark" in position L21 is removed. At the end of receipt of the third and fourth digits "marks" are inserted in L23 and L24 respectively, while at the end of transmission of the third and fourth digits, the "marks" in positions L22, L23 are removed.

*Release of regenerator*

When all the intelligence data has been received and transmitted, the store is no longer required and it must be made free for association with any other communication channel requiring storage. This is accomplished as follows.

It will be seen later that the L elements 20 . . . 23 are in the "0" condition, and in consequence F1.2 is operative when passing these elements at this time. In consequence gate G518 (FIG. 3) will not be opened in TL20 . . . 23 so that F16.1 will be left operative and in position T31, G514 will remain closed and "0" (space) will be recorded in element position 1, indicating that the store is now free. It is necessary now to cancel the record in position TCC5, and this happens during the next excursion whether or not calling circuit 1, 2, or 3 is connected meanwhile. The next time element 1 is read F1 will be set with F1.2 operative and G517 will not be opened so that F15.1 (FIG. 3) will be left operative. If nothing more happens before reaching TCC5, although F1.1 will operate for element 5, G516 will remain closed and F13 will be left with F13.1 operative. Thus G520 and G521, FIG. 8, will open since F14 is still in position 4 and F7.2 will operate thus recording "0" in position 5. This store is now free for use by other communication channels.

If channel 1, 2, or 3 has seized the common circuit, F14.1, 2 or 3 would have operated, followed by F13.2 due to the opening of a gate corresponding to G511 by its own F17.2. Gate G522 for F14.1, 2, or 3 is opened in time position 3, 4, or 5 and "0" is recorded for elements 5 . . . 11.

When the communication channel is dissociated from the store after all the intelligence data has been transmitted, BR and AR are left in the operated condition, and FB.1 and FA.1 will be conducting at this time.

When the connection is eventually released, the release of relay RR, FIG. 2, closes contacts *rr1*, *rr2* which open gates GM7, GM8 and operate FB.2 FA.2, thus releasing FB.1, FA.1. Relays AR, BR are therefore released, and contacts *br1* open to removed busy earth from the *c* wire of the incoming trunk.

*Selected detailed circuits*

Three portions of the circuit have been chosen for description as being typical of many other portions. These are gates G62, G63 and G64 of FIG. 8, shown in detail in FIG. 12, flip-flop F8 and its associated circuitry of FIG. 6, shown in detail in FIG. 13, and counter C2 of FIG. 5, shown in detail in FIG. 14.

The three gates in FIG. 8 which have been selected for description form part of an extremely complex gating network associated with the recording control flip-flop F7.

The gates used are basically simple rectifier coincidence gate circuits. In such gate circuits a common point, which is the output point of the circuit, is connected to a number of control points and to a source of biassing positive potential. The connection to the biassing source includes a resistor and the connections to the control points each include a rectifier.

The potential of a control point can assume either of two distinct values, one of which is ineffective to operate a gate circuit, being at or near to earth potential, and the other of which is effective to operate a gate circuit, being a positive potential. If, as in the case in many of the gate circuits used in this circuit, the control point is in the cathode circuit of a cold-cathode gaseous discharge gap, the control point potential is at its ineffective value when the gap is quiescent and is at its effective value when the gap is discharging.

The rectifiers are so oriented as to be in the direction of easy conductivity for current flowing from the biassing source through the rectifiers to the respective control points. Thus the effect of the rectifiers is to hold the common point at the potential of the least positive of the control points. This arrangement is such that if nominally equal positive, or effective, potentials are simultaneously present on all control points of a gate circuit, the potential of the common point of that gate circuit is substantially equal to the nominal control point potenial. Thus it will be seen that the common point, i.e. the output point of the gate circuit, only assumes a positive potential when positive potentials are simultaneously present on all control points. As has been stated this common point potential is equal to the least positive of the control point potentials.

The connection from the common point of a gate circuit to the next stage of the circuit sometimes includes a rectifier oriented in the direction of easy conductivity for current flowing from the common point to the next stage of the circuit. Such rectifiers serve as decouplers and are required where the same point in the circuit can be controlled via any one of several independent gates. They serve to ensure that one gate cannot disable a number of others connected to that point.

Figure 12:
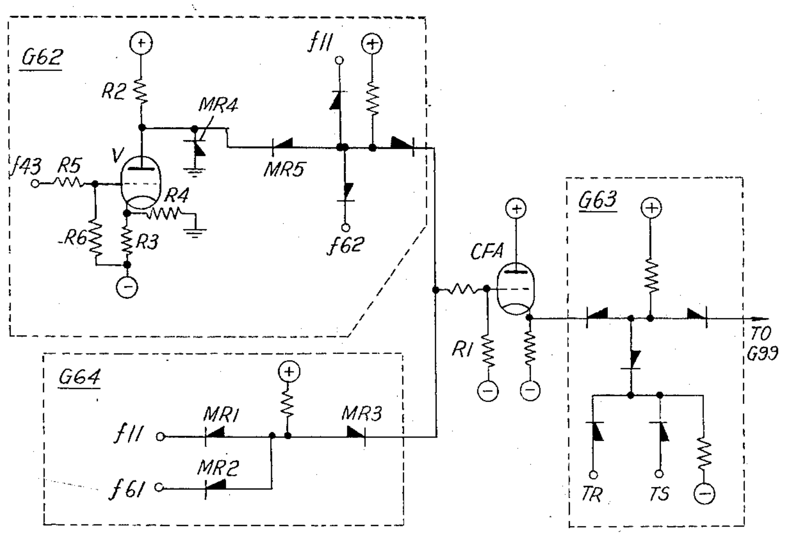
FIGS. 12 to 14 show selected parts of the circuits "translated" to more detailed circuits.

Turning now to FIG. 12, it will be seen that G64 is a simple gate of this type, having two controls, one from the cathode circuit of tube F1.1 and one from that of tube F6.1. When both of these tubes are discharging their cathode potentials are positive, and so rectifiers MR1 and MR2 are biased positively. This means that the common point assumes a positive potential which is applied via decoupling rectifier MR3 to the grid of a cathode follower tube CFA. The grid of this tube is connected via a resistor R1 to a negative potential so that normally CFA is cut off. When G64 or G62 for that matter, delivers an output CFA conducts and a positive potential appears on its cathode.

Now the second gate G62 controlling CFA will be considered. Reference to FIG. 8 shows that it has three control inputs, *f*11, *f*62 and *f*43, of which the last is an inhibitory input. That is, when F4.3 is discharging the gate is disabled no matter what the state of the other inputs. To obtain this, the output of *f*43 is inverted and the result of the inversion is used as a control.

The inverter circuit uses a single triode V whose anode is connected to earth via a rectifier MR4 and to a positive potential of about 60 volts via a resistor R2. The cathode of V is connected to a point on the bleeder R3—R4 extending between negative supply and earth. The control grid is connected to a point on a bleeder R5—R6 which extends between negative supply and the control point *f*43, that is, the cathode of tube F4.3.

The circuit components are so proportioned that when F4.3 is quiescent with its cathode voltage at or near earth potential tube V is cut off. This means that its anode voltage is determined by the positive supply connected thereto via R2. While these conditions exist, the coincidence of *f*11 and *f*62 will cause the gate G62 to deliver an output. When F4.3 is discharging its cathode voltage goes positive, so tube V conducts. The rectifier MR4 then holds the anode potential at earth, which effectively inhibits the gate no matter what the conditions of *f*1.1 and *f*6.2.

Resistor R2 and rectifier MR5 could be omitted without the circuit failing to operate, but the arrangement shown has been found to give better results than with R2 and MR5 omitted. The inverter circuit used here is more fully described and is claimed in U.S. Patent No. 2,688,695, issued September 7, 1954.

The relatively simple example which has been extracted from the gating network of FIGS. 7–8 indicates how this network would in actual practice be built up. Cathode followers similar to CFA are required at a number of points to enable satisfactory impedance relations to be attained. There is, however, in view of FIG. 12 no great difficulty in working out the network of FIGS. 7 and 8.

Figure 13:
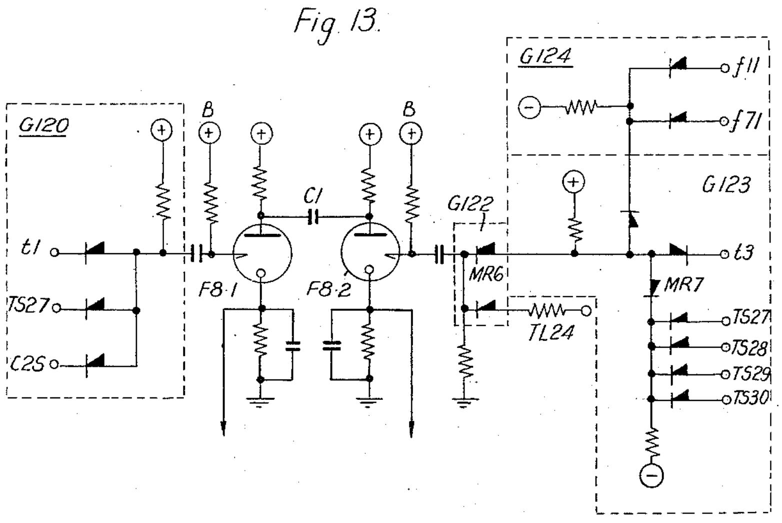
Figure 14:
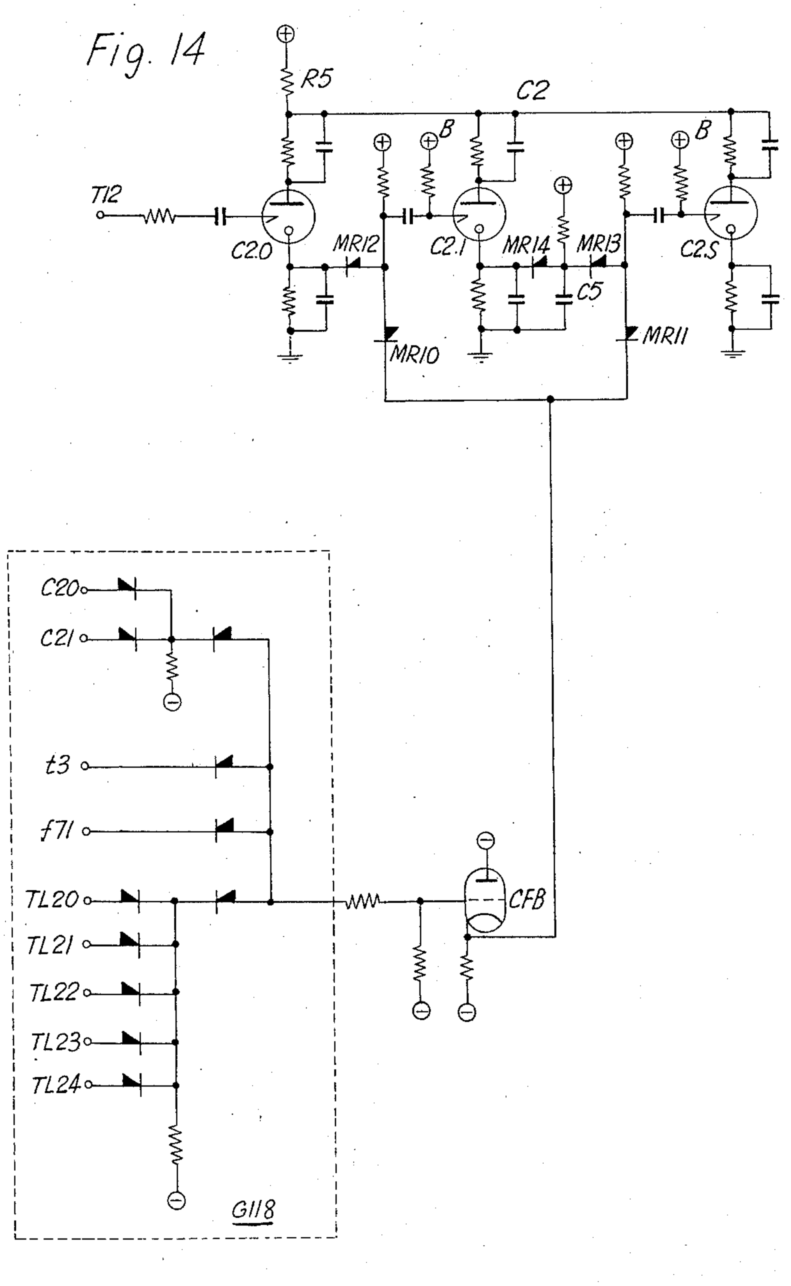

The next circuit to be described is that shown in FIG. 13. The flip-flop, which uses two cold cathode gas-filled discharge tubes has its anodes coupled by a capacitor C1. The trigger electrodes are connected via resistors to a source of bias voltage B whose value is less than that of the normal supply voltage, for example 170 volts with a supply voltage of 350 volts. This bias voltage alone cannot fire a tube. When a positive potential pulse is applied to the trigger electrode of the non-discharging tube, that tube discharges. The anode circuit causes a sudden potential drop on the anode of the newly-fired tube, which potential drop is applied to the anode of the other tube via C1, and extinguishes that other tube.

The gate C120 which is connected to tube F8.1 is a simple "three" gate. Tube F8.2 is controlled by gate G122, which comprises two rectifiers which together form a mixing gate or an "one" gate. One input which can operate F8.2 is from TL24, while the other is from G123. The rectifier MR6, which as shown is part of G122 acts as a decoupler for G123. G123 is a "three" gate, one of whose inputs is *t*3. The next input, TS27 to 30 is energised during any one of these four time positions so the element pulses in question are applied to four rectifiers which together form a mixing gate. A positive potential via any one will bias MR7 effectively to operate the gate. The other input circuit is G124, which is a simple "one" or mixing gate having two inputs.

The last circuit to be described is that of the counter C2, which uses the same sort of tubes as does F8. This is shown in detail in FIG. 14. It will be assumed that the pulse at T12 has set C2 to the condition in which C2.0 is discharging. The common supply lead to the other tubes comes from the cathode of a cathode follower tube CFB which will be described later. Between consecutive pairs of tubes there is a coincidence gate of the usual simple type already described. When a positive supply pulse occurs, it biasses rectifiers MR10 and MR11 positively. However, at this time MR12 is biased positive as C2.0 is conducting and MR13 is not biassed positively. Therefore the gate MR12—MR13 gives an output pulse which via the capacitor shown fires C2.1. The increased current flowing in the common anode load resistor R5 causes an increased voltage drop thereacross, which extinguishes C2.0. Thus we now have C2.1 conducting.

Before C2.1 fired its cathode potential was at or near earth potential, so that capacitor C5 was discharged. When C2.1 fired its cathode potential went positive, biassing rectifier MR14 positively. Therefore C5 charges up from the positive supply. This so-called slow-rising output acts, in effect, as a delayed output from C2.1.

On the next pulse on the common supply lead, MR13 and MR11 will both be biased positively, thus firing C2S and extinguishing C2.1. This condition will persist until the next T12 pulse which restores the counter to its rest condition.

The cathode follower CFB gives a positive pulse output when its controlling gate G118 gives a positive pulse to its grid. This gate has two simple controls *t*3 and *f*71 and two mixing gate controls. These need no further description after the foregoing.

The circuits shown as examples should render it simple to construct circuits in accordance with the diagrams shown. However, a few additional remarks are necessary. There are three three-unit circuits, F17, F4 and F10 in FIGS. 2, 4 and 6 respectively, which are referenced as if they were flip-flops. These, which are simple multi-stable registers, could be constructed from three tubes having their anodes interconnected by capacitors, that is, a three tube version of F8. The multi-stable register F14 could conveniently be a circuit such as C2 in FIG. 14 but with more complex inter-tube gates.

The five-point counter C3 could be constructed from a multi-gap cold-cathode gas tube of the type claimed in U.S. Patent No. 2,553,585, issued May 22, 1951, and having ten storage cathodes strapped in two sets of five. This would be convenient since such a tube is a commerical product under the registered trademark "Nomotron." "Reset" at T12 would be applied to ⅙ cathodes.

Figure 15:
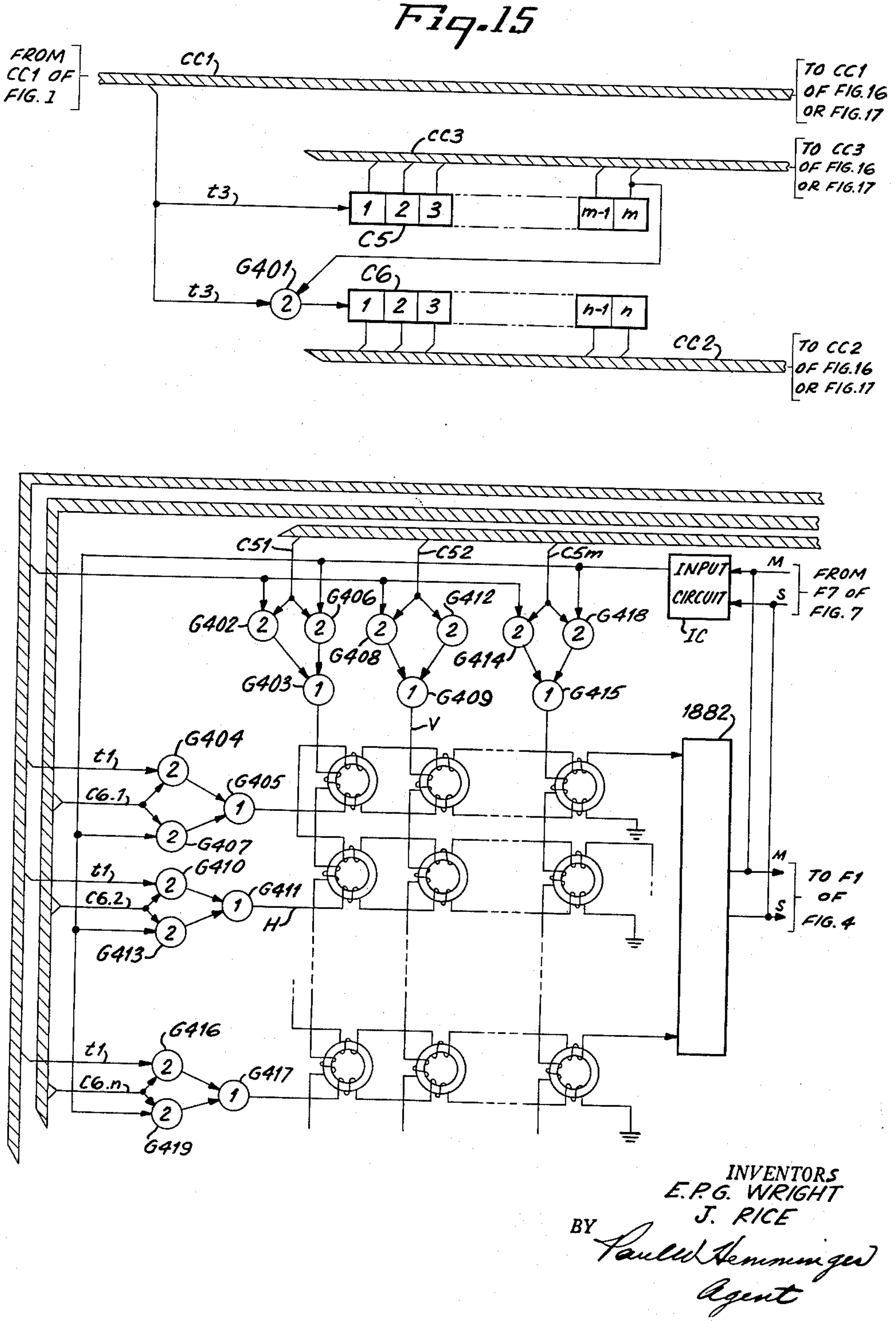
FIGS. 15 and 16 show sufficient detail of a static magnetic matrix store to understand how the invention may be used therewith.
Figure 16:
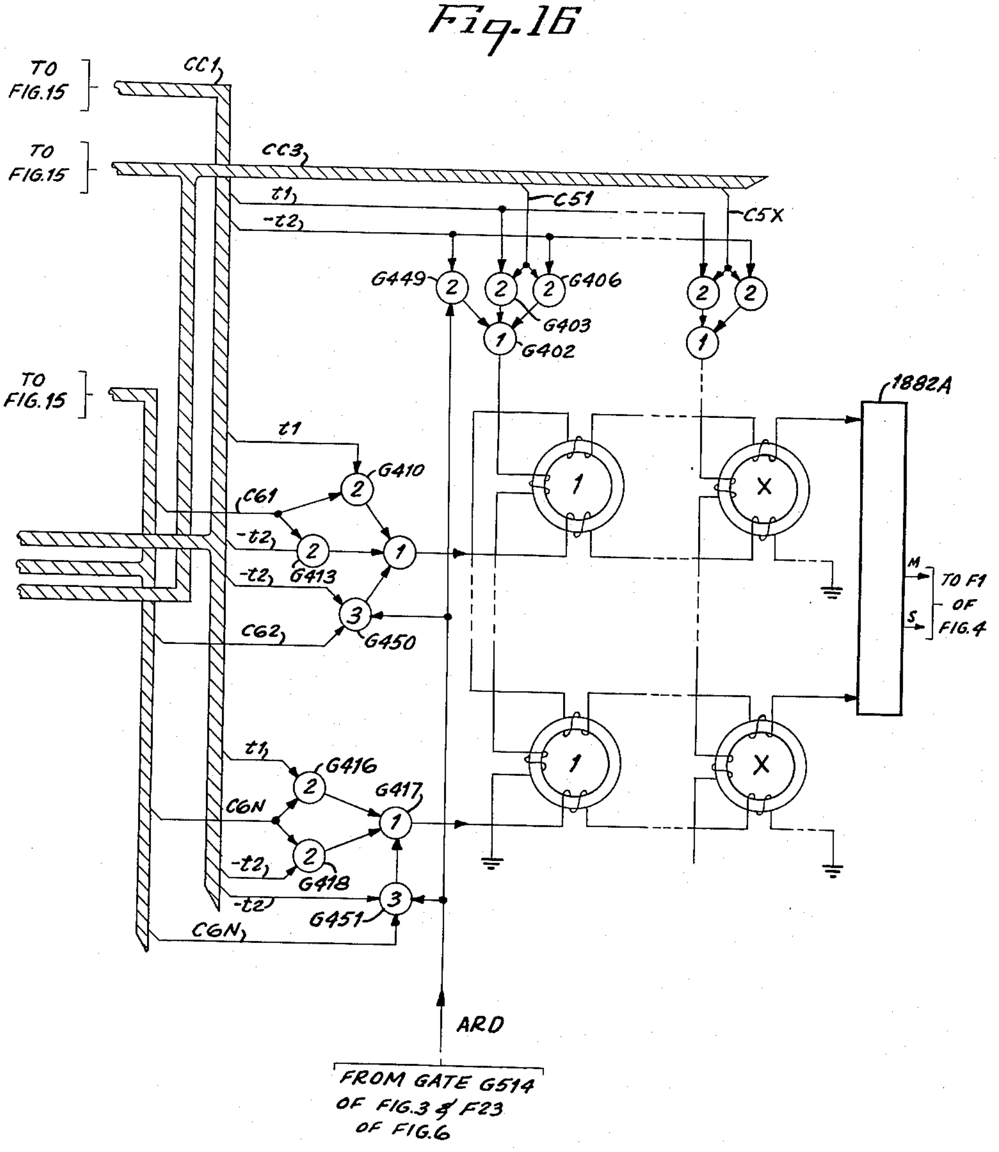
Figure 17:
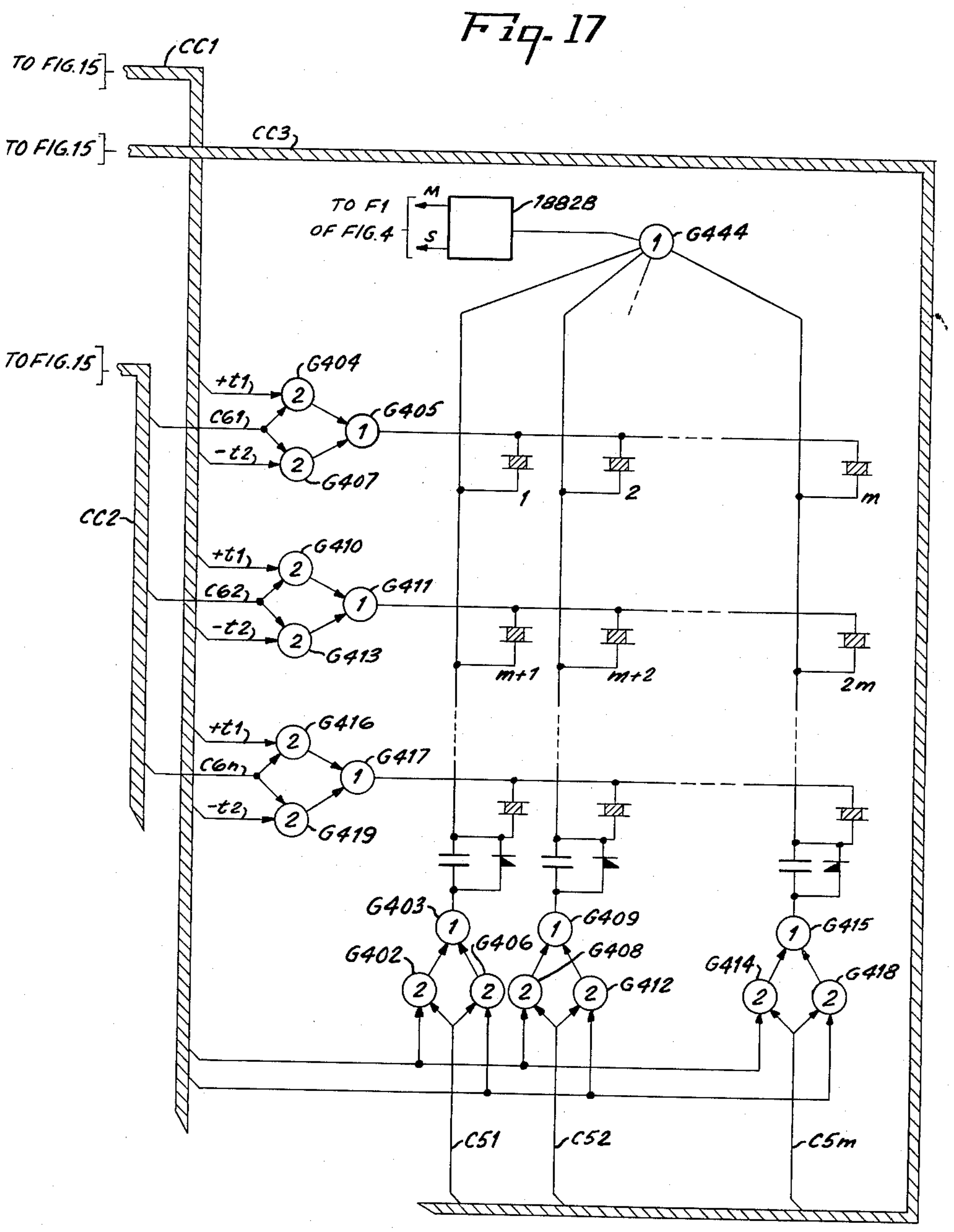
FIG. 17 shows sufficient detail of a static ferroelectric matrix store to understand how the invention may be used therewith.

All that remains to be described are certain alternative forms of memory or store which have been schematically shown in FIGS. 15–17. These are co-ordinate matrix memories. That shown in FIGS. 15 and 16, which is of the type described and illustrated in a paper entitled "Static Magnetic Matrix Memory and Switching Circuits" by J. A. Rajchman in the R.C.A. Review for June 1952 at pages 183 to 201, will be described first.

Such a matrix comprises a number of cores of magnetic material each of which can be set to either one of two stable states, which for convenience may be called positively and negatively magnetised respectively. One core per required element is provided. In the present case, where ten stores have to be provided, each of which consists of 48 element positions, at least 480 cores are needed. These cores are arranged, as shown, in *n* rows, each containing *m* cores, so that we have *mn* cores so arranged as to provide *m* columns and *n* rows of cores.

Each core has three windings, two control windings and one read-out winding. It will be seen that the uppermost windings on all cores are connected by a lead forming a common output connection: these windings are the read-out windings and the common lead is the output lead. The other windings are interconnected co-ordinately as shown.

As more fully described in the Rajchman paper, to select a given core, e.g. core $m+2$, the appropriate vertical lead V and the appropriate horizontal lead H are selected. Each then carries a current half that necessary to change the state of the core, the direction being such as to magnetise the core positively. Only $m+2$ can then be changed over, and it can obviously only change over if it is already negatively magnetized. The change over so produced causes a large change in the flux through the read-out coil of that core, and hence an output pulse. Recording will be described later. The windings are actually single wires threading the appropriate cores.

The three control pulses *t1*, *t2* and *t3*, already mentioned, are use to control operations, and, as will be described, pulses of $-t2$ are produced as and when required. Counter C5 has *m* positions, corresponding to the number of cores per row, and is stepped once by each *t3* pulse. Counter C6 has *n* positions, corresponding to the number of cores per column, and is stepped once, by C5*m* and *t3* via gate G401, for every cycle of C5. In the present case, *m* is assumed to be equal to 48, i.e. to the number of element positions per individual store, in which case the outputs from C5 can be used to provide the timed element pulses which are used so extensively for control purposes in the control circuit. Then *n* is equal to 10, i.e. to the number of stores. Clearly any other values for *m* and *n* could be adopted, one obvious alternative being 24 x 20, when two rows would be needed per store.

The outputs M or S from the control circuit flip-flop F7 of FIG. 7 are connected to the input leads 57–1 and 57–2, respectively. The outputs from C5 are applied to the gates G402, 6, 8, 12, 14 and 18 which control the currents flowing in the "column" windings, and the outputs from C6 are applied to the gates G404, 7, 10, 13, 16 and 19 which control the "row" windings. Considering one ferromagnetic core, the amplitude of the two currents acting together in an additive direction is sufficient to produce, as has been described fully by Rajchman, a magnetomotive force adequate to drive a core beyond the "knee" of the hysteresis loop. However, one of these currents alone cannot produce a magnetomotive force adequate to drive a core beyond the "knee." Further, as also described by Rajchman, the reading out operation is to drive the chosen core to be magnetised positively irrespective of its previous state. Thus if the previous state was positive magnetisation there will be no output, but if the previous state was negative magnetisation there will be an output pulse from the reading winding. It should also be noted that the reading windings are so arranged that alternate cases produce opposite polarity pulses, which serves to overcome cumulative demagnetising forces, as has been pointed out in the Rajchman paper.

It will be assumed that the distributor formed by counter C5 and C6 has units *m* and *n* respectively energised. The *t3* pulse of that element position steps C5 to C5.1, and at the same time G401 opens, so C6 steps to C6.1. At time *t1*, gates G402 and G403 and G404 and G405 are opened, so that the first "column" of windings and the first "row" of windings each pass a current pulse. As has been described, only core 1 can be affected, and since the direction of the pulse is such as to drive the core to positive magnetisation there will be no output if this core was already positively magnetised. However, if this core was already negatively magnetised an output will be given.

Although the specific circuitry in block 1882 for the connection whereby this is effected is not shown, it will be understood that suitable circuitry is connected to the output leads to provide two output wires corresponding to the output wires from the reading device of FIG. 4, one of which is caused to be positive and the other negative when a "mark" is read off and the polarity is caused to be reversed when a "space" is read off. The output pulse so produced is applied both to the inputs of flip-flop F1 (FIG. 4) of the control circuit and to the input circuit of FIG. 15. The input circuit is so arranged that if it is required to leave the core being "interrogated" positively magnetised there will be no output therefrom, while if it is required to leave the core negatively magnetised a negative pulse $-t2$ is produced. In the latter case, gates G407 and G405 and G406 and G403 open and hence pulses in the reverse direction to the original reading direction pass in the same windings. As before, only core 1 can be affected, and because of the pulse direction, this core is driven to state N as required.

The next *t3* pulse steps C5 to its unit 2, so for the next *t1* pulse the gates for the second column and the first row open. Hence core 2 is now set to or left positively magnetised and an output given or not according to its previous state. The operation continues as described for each core in turn in the order indicated in FIG. 15, C5 selecting the column and C6 selecting the row. In FIG. 15, as we have assumed that $m=48$, core $m+1$ is the first core of the second store.

FIG. 16 shows schematically how the function of the auxiliary head was used for applying a busying "chalk-mark" recording to the first element position of a seized store, this being effected at a convenient time position in the cycle, in the arrangement described at T31. In the matrix arrangement, an additional writing gate G449 is used, this being controlled by $-t2$, as is the normal column column writing gate G406, but having an additional control ARD.

When it is required to use the "back-recording" facility, the terminal ARD is energised. This terminal is controlled from gate G514 (FIG. 3) or from flip-flop F23 (FIG. 6) as and when required. The only difference between this technique and that used when recording on the drum is that it is essential to ensure that the time position used to energise ARD is not also used to record via the normal writing gate. If this were not done, spurious recording could occur as a result of undesirable pick-up when three (or over four in some core arrangements) lines were energised at once.

In FIG. 16 two cores from the second row and two from the last row are shown. G450 and G451 are the "row" gates for the "back-recording" function, while the other gates are the normal gates shown in FIG. 15.

In both FIGS. 15 and 16 it will be seen that the symbols for voltage gates have been shown in the interests of simplicity of the diagrams. However, current control is used for the matrix, this being produced, for example, by hard valves controlled by the gates shown in these figures.

FIG. 17 shows schematically a co-ordinate matrix which is generally similar to that shown in FIGS. 15 and 16, but using so-called ferroelectric elements. Ferroelectric materials are dielectrics in which electric dipoles occur spontaneously and align themselves by mutual interaction. Their curves of dielectric induction against electric fields shown hysteresis loops similar to those shown by the B–H curves of ferromagnetic materials. Barium titanate ($BaTiO_3$) would appear at present to be the most practicable ferroelectric material. A full description of a memory or store using these materials will be found in a paper entitled "Ferroelectric Storage Elements for Digital Computer and Switching Systems" by J. R. Anderson, published in "Electrical Engineering" for October 1952 at pages 916–922.

The operation is in many ways similar to that of the ferromagnetic matrix, as will become apparent. In view of the Anderson paper mentioned above it is only necessary to say that applying a "write" voltage pulse to na element sets it to one stable state of electrification, and a "read" pulse drives an element in which a pulse has been stored to its other stable state giving a large output pulse. Using barium titanate, an output pulse of 25 volts for a stored condition or mark has been obtained when the input pulse was 30 volts, 5 ms., as compared with 0.6 volt for no stored condition or space. In the present case shorter pulses are needed which will reduce the differentiation somewhat.

The matrix of FIG. 17 comprises a number *mn* of ferroelectric elements connected in rows and columns as in FIG. 15. Again a convenient arrangement could be $m=48$, $n=10$, or $m=24$, $n=20$, and as in FIG. 15 the same counter arrangements would be used. The gates in FIG. 17 are given the same references as the corresponding gates in FIG. 15.

To select a given element for reading or writing half the required voltage is applied to the "row" connection and half to the "column" connection, and one element is affected. As before, read-out is at *t1* and "write" is at *t2*.

The individual elements each have a capacitor paralleled by a rectifier in series therewith in the basic device: in FIG. 17 these components are common to the columns. Output leads are taken from the columns to an output gate G444, and as in FIG. 15 arrangements for retaining a read out pulse are provided. The output of gate G444 is connected to circuitry similar to that described in connection with FIG. 15 to provide two wires connected to the inputs of F1 in FIG. 4. The *t2* lead is similarly connected to the input circuit which is connected to the output of the flip-flop F7 in FIG. 7. Reading occurs at *t1* and always restores the element to "space" condition or leaves it in "space" condition if it is already in that state. Therefore if F7 is set to F7.2 to record "space," no further operation on the ferroelectric matrix is needed. If F7 is set to F7.1 to record "marks," however, it is necessary to energize the *t2* leads in FIG. 17. The energization of the *t2* leads, one positively and one negatively, can be effected by circuitry similar to that described in connection with the output of FIG. 15.

One preferred form of matrix comprises a single large crystal of barium titanate of 4 to 10 mils thick having a set of parallel conducting strips on each face, the two sets of strips being orthogonally related. Each cross point provides a single storage element.

While the principles of the invention have been described above in connection with specific embodiments, and particular modifications thereof, it is to be clearly understood that this description is made only by way of example and not as a limitation on the scope of the invention.

What we claim is:

1. Interconnecting equipment comprising a number of first equipments, a second equipment, means for connecting any selected one of said first equipments to said second equipment in a time position of a recurrent cycle of time positions which is different for each of said first equipments, a group of stores, said stores being fewer in number than the number of first equipments, recording and reading means for scanning said stores in different time positions in said recurrent cycle, means for operating said recording means to record a signal representing the identity of any connected first equipment in the store corresponding to the time position in which said connection has occurred, and means responsive to said reading means reading a signal recorded in a store for operating said connecting means to reconstitute the connection of the corresponding first equipment to said second equipment in the respective time position in each successive cycle during which connection is to persist.

2. Equipment for storing intelligence, which comprises a number of stores, a plurality of user equipments, the number of user equipments being greater than the number of stores, means in each user equipment for generating an electrical calling condition, recording and reading means for said stores, means for making each of said stores available to any one of said user equipments, a control circuit connected to said recording and reading means, means in said control circuit responsive to said electrical calling condition indicating that one of sad user equipments requires a store for allocating a free store temporarily to that user equipment, means for causing said recording and reading means repeatedly to examine said allocated store, and means for maintaining said temporary allocation throughout a plurality of examinations of said allocated store by said recording and reading means.

3. Equipment for storing intelligence which comprises a plurality of user equipments, means in each user equipment for generating an electrical calling condition, an endless track of magnetic material on which intelligence can be recorded, recording and reading means mounted in operative relation to said track, said track being movable with respect to said recording and reading means so as to cause repeated appearances of a store at said recording and reading means, said track providing a number of stores, said number of stores being fewer than the number of user equipments, means for making each of said stores available to any one of said user equipments, a control circuit connected to said recording and reading means, means in said control circuit responsive to said electrical calling condition indicating that one of said user equipments requires a store for allocating a free store temporarily to that user equipment, and means for maintaining said temporary allocation throughout a plurality of appearances of said allocated store at said recording and reading heads.

4. Equipment for storing intelligence which comprises a plurality of user equipments, means in each user equipment for generating an electrical calling condition, a number of storage elements in which intelligence can be recorded as either one of two stable states, means for recording intelligence by sequentially applying electrical energy selectively to said elements to set each said element to the appropriate one of said stable states, reading means for said elements comprising means for sequentially applying electrical energy to said elements in such a way as to set each said element to a predetermined one of said states, and means for re-setting an element changed by said reading means if the intelligence read is to be retained, whereby said elements are scanned by said recording and reading means, said storage elements forming a number of individual stores each consisting of a plurality of said elements, the said stores being fewer in number than the number of user equipments, means for making each of said stores available to any one of said user equipments, a control circuit connected to said recording and reading means, means in said control circuit responsive to said electrical calling condition indicating that one of said user equipments requires a store for allocating a free store temporarily to that user equipment, and means for maintaining said temporary allocation throughout a plurality of scans of said allocated store by said recording and reading means.

5. Equipment, as claimed in claim 3, and comprising means in said control circuit responsive to the examination of an allocated store by said recording and reading means to connect said control circuit temporarily to the user equipment to which said store is allocated.

6. Equipment, as claimed in claim 3, and comprising means in said control circuit responsive to allocation of a free store to a user equipment to cause said recording means to make a recording in said allocated store, which recording represents the identity of said user equipment, and means in said control circuit responsive to an identity recording read by said reading means to connect said control circuit temporarily to the corresponding user equipment.

7. Equipment, as claimed in claim 6, and which comprises second recording means for said stores and displaced from said first recording means in the direction of relative movement of said stores with respect to said recording and reading means so that each said store is in operative relation with said second recording means after being in operative relation with said first recording means, and means in said control circuit responsive to said allocation and to a predetermined relation between said allocated store and said first recording means to cause said second recording means to record a busy indication at the beginning of said allocated store.

8. Equipment, as claimed in claim 7, and in which said allocating means comprises a scanning circuit common to said stores and arranged to scan said user equipments in search of a calling condition, means responsive to detection of a calling condition to stop said scanning circuit at the position individual to the user equipment which generated said calling condition, and further means responsive to said detection to cause said recording representing the identity of said user equipment.

9. Electrical equipment, as claimed in claim 8, in which a plurality of element positions on each said store are used to record the identity of a user equipment to which said store has been allocated, each one of said element positions being individual to one of said user equipments so that a recording therein indicates that said store has been allocated to the corresponding user equipment, and in which said scanning circuit comprises a static distributor which has an output individual to each said user equipment, and means for causing said outputs to be energised singly and successively in such a way that when an identity recording element position of a store is in operative relation with said first recording means the output from said scanning circuit characteristic of the corresponding user equipment is energised, whereby a recording effected at that time is characteristic of the same user equipment.

10. Electrical equipment, as claimed in claim 9, and which comprises means in said control circuit responsive to each store commencing to be in operative relation with said reading means and said first recording means to start said scanning circuit, means in said control circuit responsive to an identity recording on an allocated store to stop said scanning circuit with its output characteristic of the corresponding user equipment energised, and means in said control circuit responsive to said stoppage to effect said temporary interconnection.

11. Equipment, as claimed in claim 2, and which comprises means for modifying stored intelligence under control of a user equipment, means for passing intelligence read by said reading means to said modifying means, and means for passing said modified intelligence to said recording means.

12. Equipment, as claimed in claim 2, and which comprises means for timing a period between successive changes of an electrical condition in said user equipment by counting the number of times an allocated store is in operative relation with said reading means during said period.

13. Equipment, as claimed in claim 12, and which comprises means for storing in said allocated store numbers received in the form of impulse trains from said user equipment, separate digits of said number being stored in separate parts of said store, means for timing a period commencing with the end impulse of a digit and ending with the beginning of the next digit impulse, means under control of said timing means for detecting an interdigital pause, and means responsive to detection of an interdigital pause to route the next received digit, if any, to the appropriate part of said store.

14. Equipment, as claimed in claim 13, and which comprises means for retransmitting stored intelligence, and means responsive to said retransmission to remove said intelligence from said store after retransmission.

15. Equipment, as claimed in claim 14, and in which the means for retransmitting said intelligence retransmits it as impulse trains each containing a number of impulses which corresponds to the number of impulses in one of said stored trains, the timing of said impulses being such an inter-impulse pause and an inter-digital pause each having a duration determined by a definite number of examinations of said allocated store, and further comprising timing means for determining the duration and spacing of said retransmitted impulses.

16. Equipment, as claimed in claim 3, and in which said endless magnetic track is a circumferential magnetic track on a rotatable drum or disc.

17. Equipment, as claimed in claim 16, and in which each said store comprises two separated equal lengths of track, said lengths of track being so arranged that when one of said lengths is in operative relation with said reading means the recording means is in operative relation with a corresponding portion of said other length of track.

18. Equipment, as claimed in claim 4, and wherein each said storage element is a ferromagnetic element.

19. Equipment, as claimed in claim 4, and wherein each said storage element is a ferroelectric element.

References Cited in the file of this patent

UNITED STATES PATENTS

| | | |
|---|---|---|
| 2,297,365 | Ostline | Sept. 29, 1942 |
| 2,492,136 | Deloraine | Dec. 27, 1949 |
| 2,512,676 | Ransom | June 27, 1950 |
| 2,629,016 | Gooderham | Feb. 17, 1953 |
| 2,629,827 | Eckert et al. | Feb. 24, 1953 |
| 2,700,148 | McGuigan et al. | Jan. 18, 1955 |
| 2,701,095 | Stibitz | Feb. 1, 1955 |
| 2,709,041 | Gallup | May 24, 1955 |
| 2,716,159 | Flowers | Aug. 23, 1955 |
| 2,721,990 | McNaney | Oct. 25, 1955 |
| 2,723,311 | Malthaner | Nov. 8, 1955 |
| 2,749,037 | Stibitz | June 5, 1956 |
| 2,805,286 | Baker | Sept. 3, 1957 |

OTHER REFERENCES

"Digital Computer Switching Circuits," article in "Electronics," September 1948, pp. 110–116 and 118.